(12) United States Patent
Higurashi

(10) Patent No.: US 10,789,921 B2
(45) Date of Patent: Sep. 29, 2020

(54) AUDIO EXTRACTION APPARATUS, MACHINE LEARNING APPARATUS AND AUDIO REPRODUCTION APPARATUS

(71) Applicant: CASIO COMPUTER CO., LTD., Shibuya-ku, Tokyo (JP)

(72) Inventor: Daiki Higurashi, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/447,796

(22) Filed: Jun. 20, 2019

(65) Prior Publication Data

US 2019/0392802 A1     Dec. 26, 2019

(30) Foreign Application Priority Data

Jun. 25, 2018  (JP) .................. 2018-120236

(51) Int. Cl.

| | | |
|---|---|---|
| G10H 1/36 | (2006.01) | |
| G10L 25/81 | (2013.01) | |
| G10L 25/18 | (2013.01) | |
| G10H 1/00 | (2006.01) | |
| H04S 3/00 | (2006.01) | |
| G06N 20/00 | (2019.01) | |
| G10L 25/27 | (2013.01) | |

(52) U.S. Cl.
CPC .......... *G10H 1/361* (2013.01); *G06N 20/00* (2019.01); *G10H 1/0008* (2013.01); *G10L 25/18* (2013.01); *G10L 25/27* (2013.01); *G10L 25/81* (2013.01); *H04S 3/008* (2013.01); *G10H 2210/005* (2013.01); *G10H 2220/011* (2013.01)

(58) Field of Classification Search
CPC ................ G10H 1/361; G10H 1/0008; G10H 2210/005; G10H 2220/011; G10L 25/27; G10L 25/81; G10L 25/18; H04S 3/008; G06N 20/00

See application file for complete search history.

(56) References Cited

U.S. PATENT DOCUMENTS

| | | | |
|---|---|---|---|
| 9,852,745 B1 * | 12/2017 | Tootill ............... | G10L 25/18 |
| 2007/0076891 A1 * | 4/2007 | Cho .................... | G10H 1/0091 381/1 |
| 2012/0300941 A1 * | 11/2012 | Shim ................... | H04R 5/04 381/1 |
| 2014/0270185 A1 * | 9/2014 | Walsh .................. | H04S 5/00 381/17 |

FOREIGN PATENT DOCUMENTS

| | | |
|---|---|---|
| JP | H06102893 A | 4/1994 |
| JP | 2006195385 A | 7/2006 |

* cited by examiner

*Primary Examiner* — Jeffrey Donels
(74) *Attorney, Agent, or Firm* — Holtz, Holtz & Volek PC

(57) ABSTRACT

A processor in an audio extraction apparatus performs a preprocessing operation to determine, for a stereo audio source including first channel audio data including an accompaniment sound and a vocal sound for a first channel and second channel audio data including an accompaniment sound and a vocal sound for a second channel, a difference between the first channel audio data and the second channel audio data to generate center cut audio data, and an audio extraction operation to input the first channel audio data, the second channel audio data and the center cut audio data to a trained machine learning model to extract any one of the accompaniment sound and the vocal sound.

17 Claims, 20 Drawing Sheets

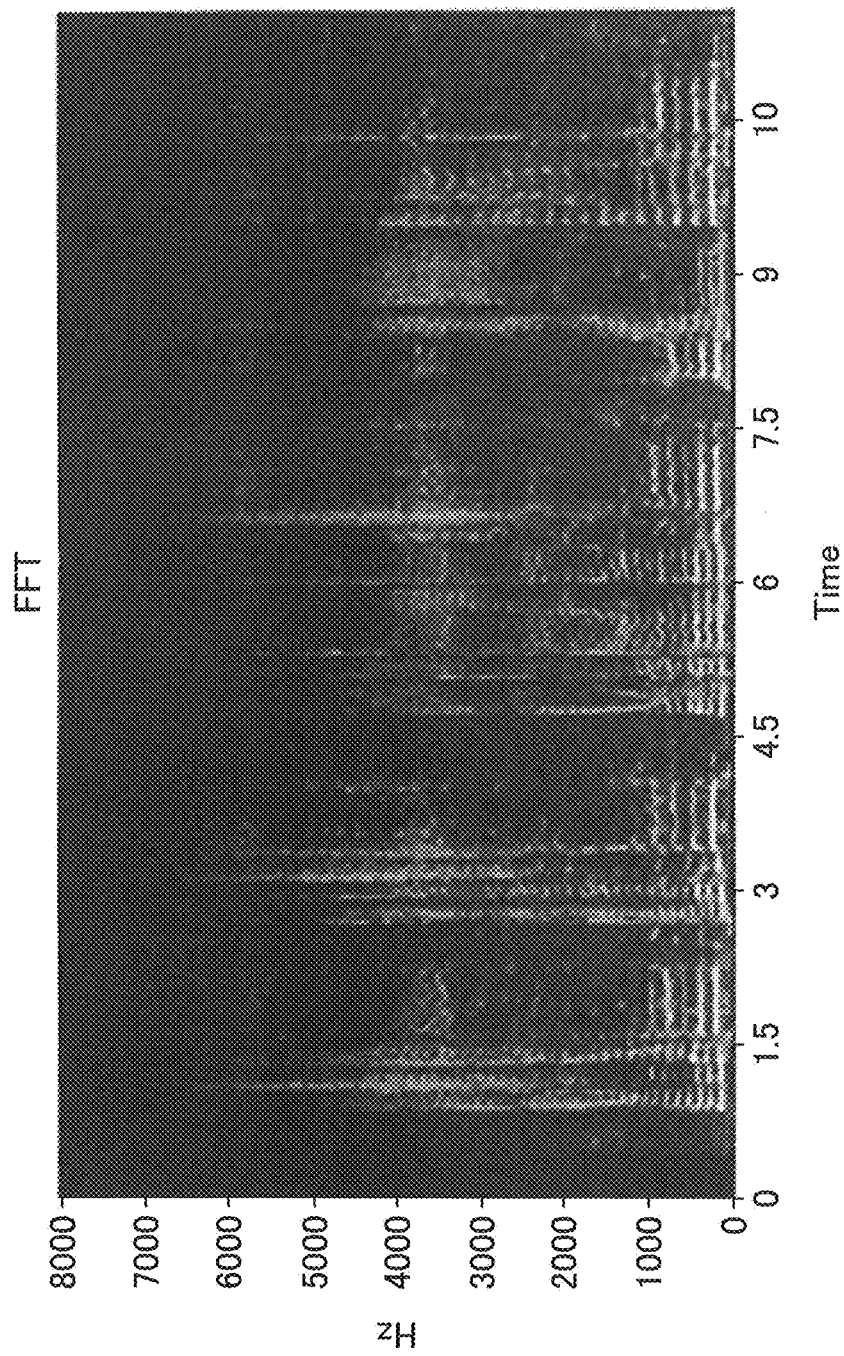

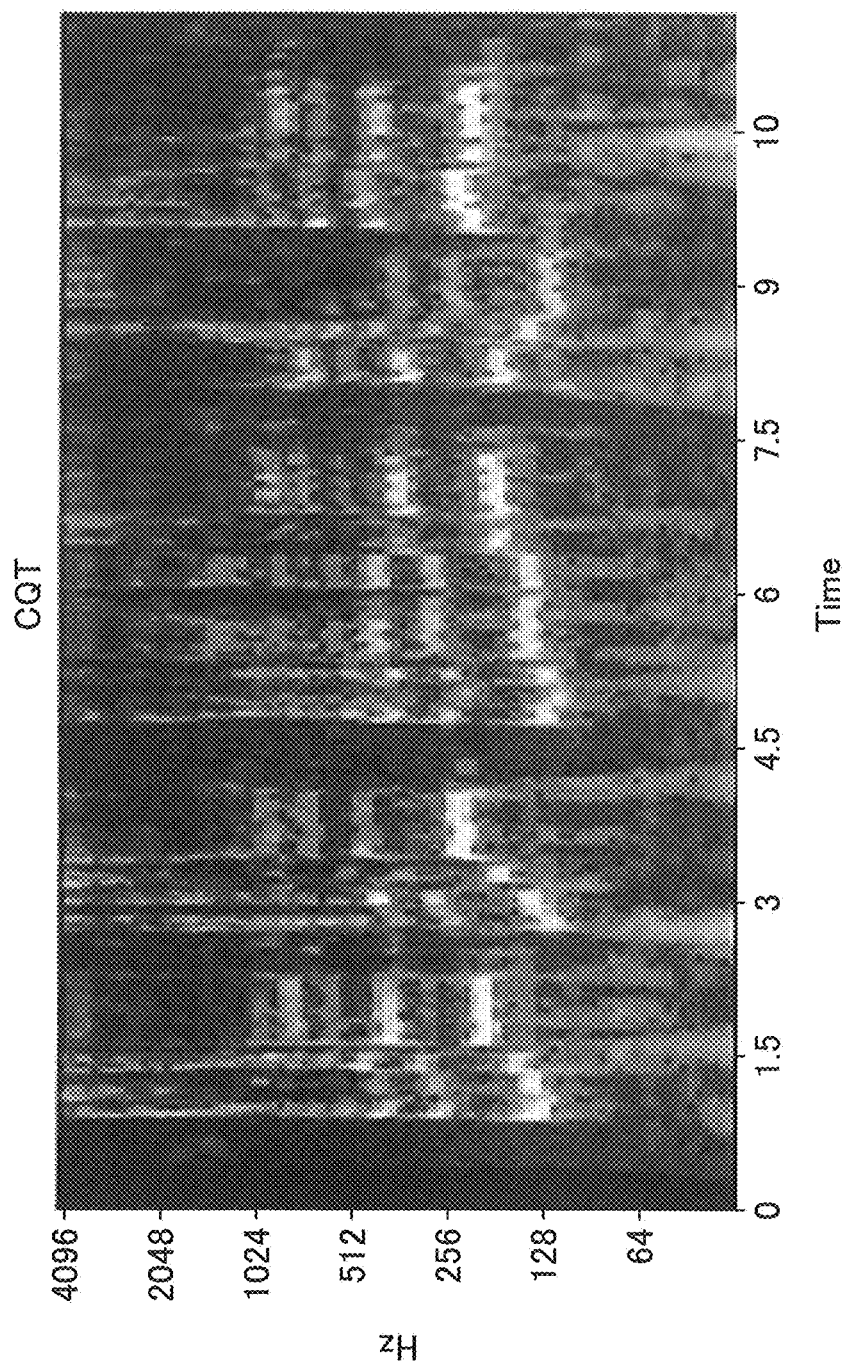

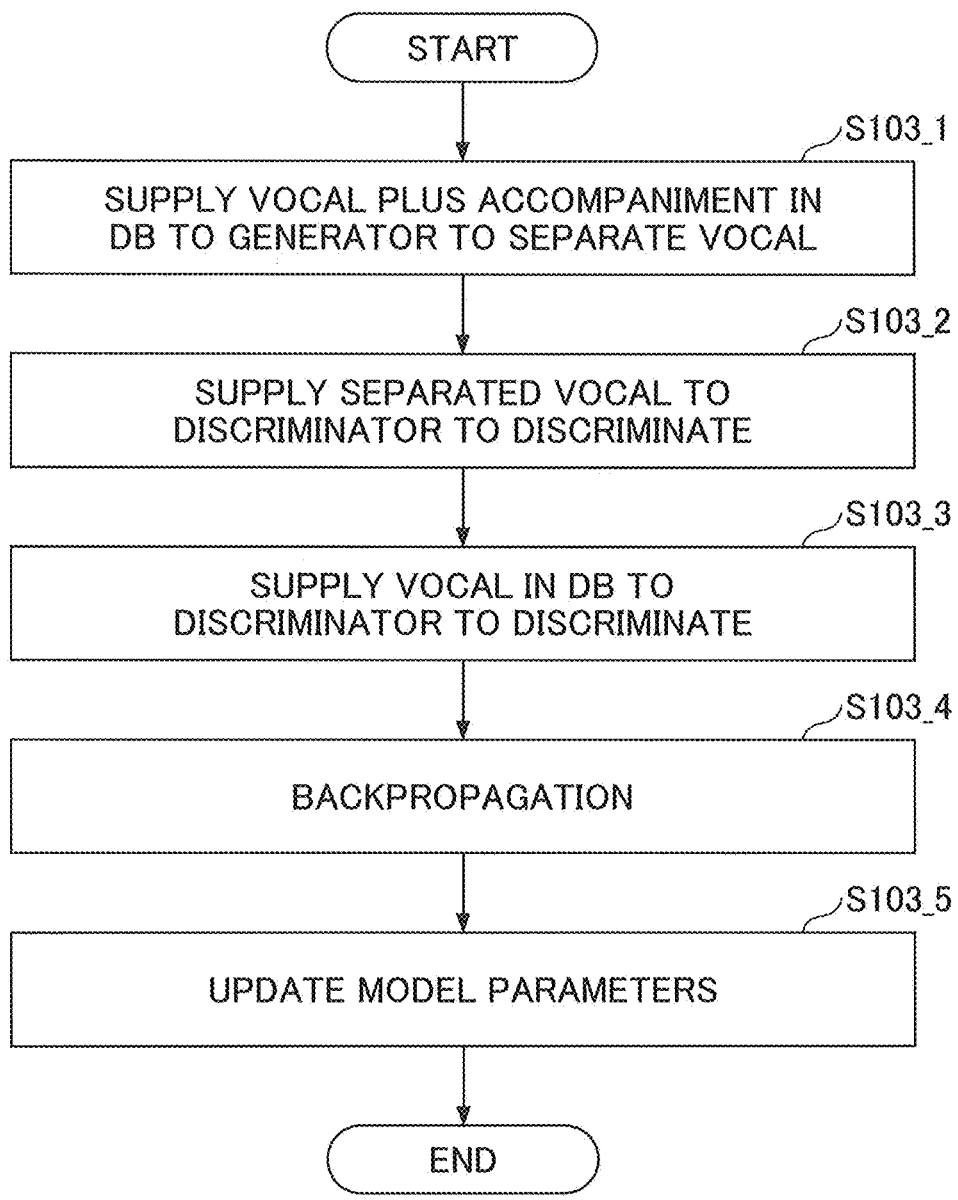

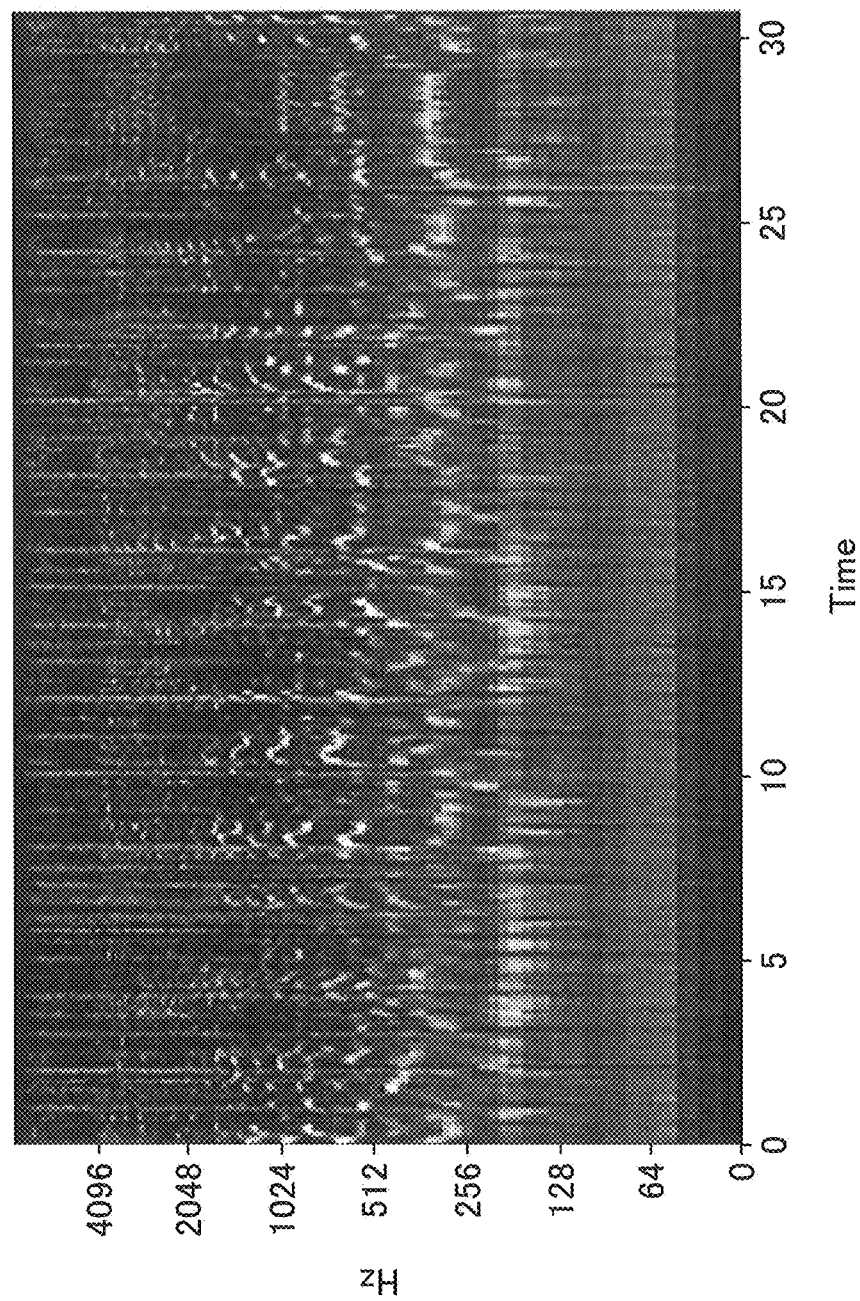

AUDIO EXTRACTION APPARATUS, MACHINE LEARNING APPARATUS AND AUDIO REPRODUCTION APPARATUS

BACKGROUND OF THE INVENTION

Field of the Invention

The present invention relates to audio processing techniques.

Description of the Related Art

Conventionally, there exist electronic keyboard instruments that teach which keys should be pressed by lighting LEDs (Light Emitting Diodes) embedded in their keyboard corresponding to pitches for a certain part such as a melody part in MIDI (Musical Instrument Digital Interface) based musical data, for example, a SMF (Standard MIDI File). According to such an electronic keyboard instrument, a lesson functionality of lighting keys to teach melodies for music desired by a user to play can be implemented.

In data consisting of codes arranged in chronological order, for example, a MIDI data having a channel number attached such as a SMF, a melody pitch, a sound length or the like for an extracted certain part can be presented to a user.

Accompaniments and melodies are mixed in typical musical audio signals, such as a CD (Compact Disk) and mp3, and it is difficult to separate only a certain part, for example, an accompaniment sound, from such signals.

Meanwhile, some techniques for generating karaoke audio data through separation into an accompaniment sound and a vocal sound included in a commercially available music CD are known. (See JP 2006-195385, for example.)

SUMMARY OF THE INVENTION

One aspect of the present invention relates to an audio extraction apparatus comprising a processor that performs:

a preprocessing operation to determine, for a stereo audio source including first channel audio data including an accompaniment sound and a vocal sound for a first channel and second channel audio data including an accompaniment sound and a vocal sound for a second channel, a difference between the first channel audio data and the second channel audio data to generate center cut audio data; and an audio extraction operation to input the first channel audio data, the second channel audio data and the center cut audio data to a trained machine learning model to extract any one of the accompaniment sound and the vocal sound.

Another aspect of the present invention relates to an audio reproduction apparatus comprising a processor that performs:

a preprocessing operation to transform audio data including an accompaniment sound and a vocal sound into first multi-dimensional data at least having a first axis corresponding to time and a second axis corresponding to audio information regarding an audio frequency;

an accompaniment sound extraction operation to input the transformed first multi-dimensional data to a neural network to acquire second multi-dimensional data, wherein the neural network is trained to output, for incoming multi-dimensional data corresponding to audio data including a mixture of an accompaniment sound and a vocal sound, multi-dimensional data corresponding to audio data including the accompaniment sound without any mixture of the vocal sound; and a reproduction operation to transform the acquired second multi-dimensional data into second audio data including the accompaniment sound without any mixture of the vocal sound and reproduce the transformed second audio data.

Another aspect of the present invention relates to an audio extraction method comprising:

determining, by a processor, for a stereo audio source including first channel audio data including an accompaniment sound and a vocal sound for a first channel and second channel audio data including an accompaniment sound and a vocal sound for a second channel, a difference between the first channel audio data and the second channel audio data to generate center cut audio data; and extracting, by the processor, any one of the accompaniment sound and the vocal sound from the first channel audio data, the second channel audio data and the center cut audio data with a trained machine learning model.

Another aspect of the present disclosure relates to an audio reproduction method comprising:

transforming, by a processor, audio data including an accompaniment sound and a vocal sound into first multi-dimensional data at least having a first axis corresponding to time and a second axis corresponding to audio information regarding an audio frequency;

inputting, by the processor, the transformed first multi-dimensional data to a neural network to acquire second multi-dimensional data, wherein the neural network is trained to output, for incoming multi-dimensional data corresponding to audio data including a mixture of an accompaniment sound and a vocal sound, multi-dimensional data corresponding to audio data including the accompaniment sound without any mixture of the vocal sound; and transforming, by the processor, the acquired second multi-dimensional data into second audio data including the accompaniment sound without any mixture of the vocal sound and reproducing the transformed second audio data.

Another aspect of the present disclosure relates to a machine learning method comprising:

acquiring, by a processor, for a stereo audio source including first channel audio data including an accompaniment sound and a vocal sound for a first channel and second channel audio data including an accompaniment sound and a vocal sound for a second channel, the first channel audio data, the second channel audio data and center cut audio data as training input data, wherein the center cut audio data is generated by determining a difference between the first channel audio data and the second channel audio data, and acquiring any one of the accompaniment sound and the vocal sound as training output data; and training, by the processor, a machine learning model to generate the training output data from the training input data.

BRIEF DESCRIPTION OF THE DRAWING

FIG. 3A is a diagram for illustrating spectrograms obtained by Fourier transforming and constant Q transforming audio data according to one embodiment of the present disclosure.

FIG. 3B is a diagram for illustrating spectrograms obtained by Fourier transforming and constant Q transforming audio data according to one embodiment of the present disclosure.

FIG. 6 is a flowchart for illustrating details of the training operation for the audio separation model according to one embodiment of the present disclosure.

FIG. 7B is a diagram of spectrograms for audio data and separated audio data according to one embodiment of the present disclosure.

DETAILED DESCRIPTION OF THE PREFERRED EMBODIMENTS

First Embodiment

In the following embodiments, an audio processing technique is disclosed for training an audio separation model for separating a certain type of instrumental sound or a vocal sound (a certain audio component) from audio data and using the trained model to separate a relevant part from audio data.

A training apparatus according to the present disclosure acquires a set of training audio data made up from many pairs of audio data including multiple audio components and audio data including a certain audio component, transforms the set of training audio data into a set of image data through time frequency analyses for transforming acoustic data (audio data) into a spectrogram (image data that has a frequency axis and a time axis as a vertical axis and a horizontal axis, respectively, and pixel colors corresponding to signal intensities), and trains an audio separation model with the set of image data. In this embodiment, an image transformation scheme resulting in a logarithmic frequency axis such as a constant Q transformation is particularly used for the time frequency analyses instead of an image transformation scheme resulting in a linear frequency axis such as a common Fourier transform. In other words, the image transformation scheme having a logarithmic frequency axis is used so that a lower frequency band including a larger amount of to-be-separated audio components can have a higher resolution than a higher frequency band and features of a frequency distribution (a frequency distribution such that even if a frequency of fundamental tone changes due to variations in pitches, harmonic components for the fundamental tone cannot be changed) specific to a type of musical instrument or a human being (or an individual) instead of pitches can be more effectively shown. Also, an audio separation apparatus according to the present disclosure acquires audio data including multiple audio components, transforms the audio data into image data in accordance with an image transformation scheme having a logarithmic frequency axis, supplies the image data to a trained audio separation model provided from a training apparatus, acquires separation image data showing a certain audio component and transforms the separation image data into audio data having the certain audio component extracted.

Note that the term "image data" used herein is any information that may be represented as a two-dimensional array, and implementations stored in a memory or implementations of cases where information stored in the memory is displayed on a screen do not need to be implementations that human beings can visually recognize as images but may be any type of implementations as long as a machine can recognize them as a two-dimensional array.

Also, the time frequency analyses include various transformation schemes such as short-time Fourier transform and wavelet transform.

Figure 1:
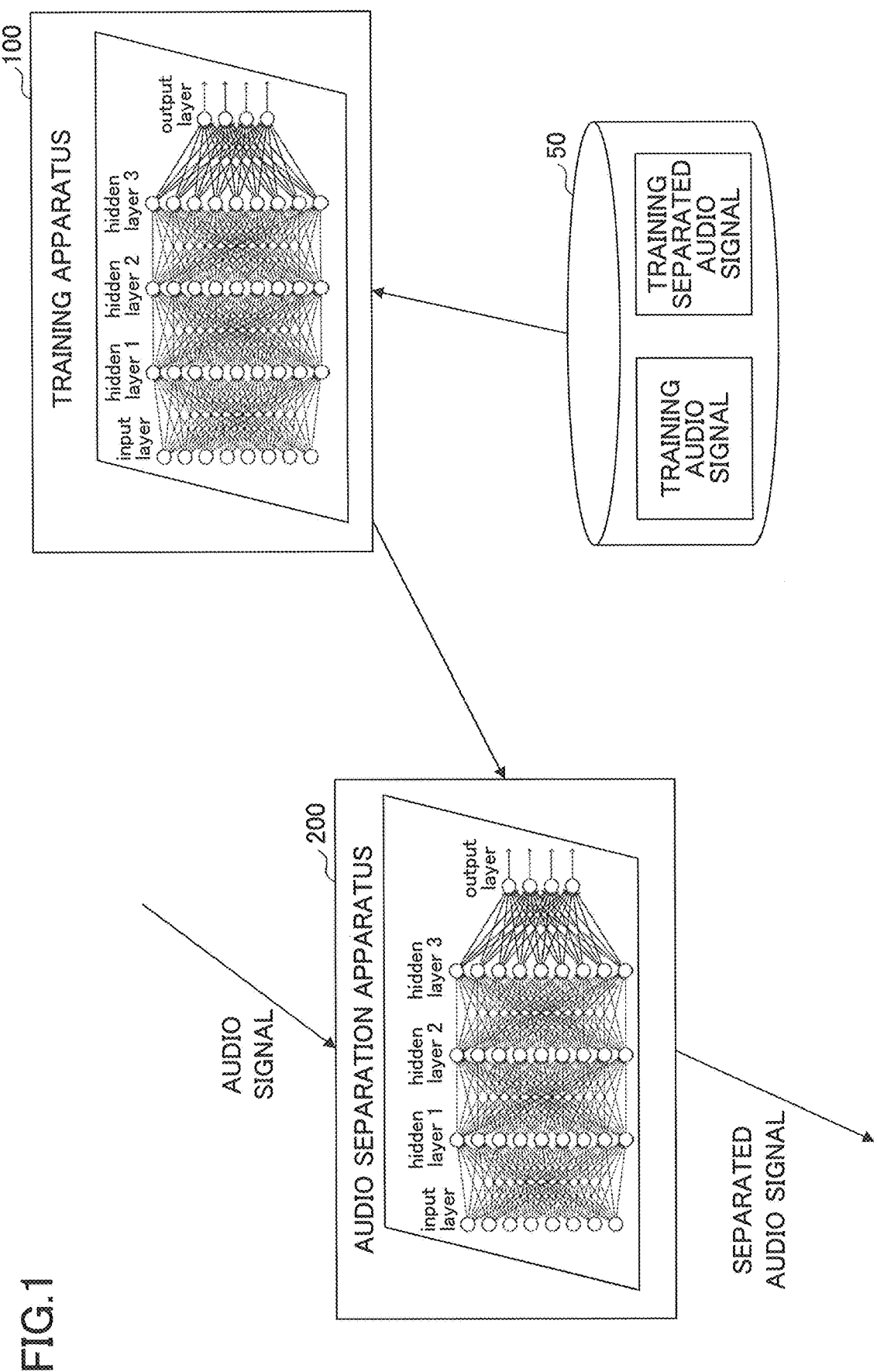
FIG. 1 is a schematic diagram for illustrating an audio separation apparatus having a trained audio separation model according to one embodiment of the present disclosure.

First, an audio separation apparatus having a trained audio separation model according to one embodiment of the present disclosure is described with reference to FIG. 1. FIG. 1 is a schematic diagram for illustrating an audio separation apparatus having a trained audio separation model according to one embodiment of the present disclosure.

As illustrated in FIG. 1, an audio separation apparatus 200 according to one embodiment of the present disclosure has, but is not limited to, an audio separation model implemented as a neural network and uses an audio separation model trained by a training apparatus 100 to generate audio data by separating a certain audio component from incoming audio data including multiple audio components. The training apparatus 100 according to one embodiment of the present disclosure trains an audio separation model with a set of training audio data including multiple audio components and the corresponding separation audio data showing a certain audio component stored in a database 50 and provides the trained audio separation model to the audio separation apparatus 200.

Figure 2:
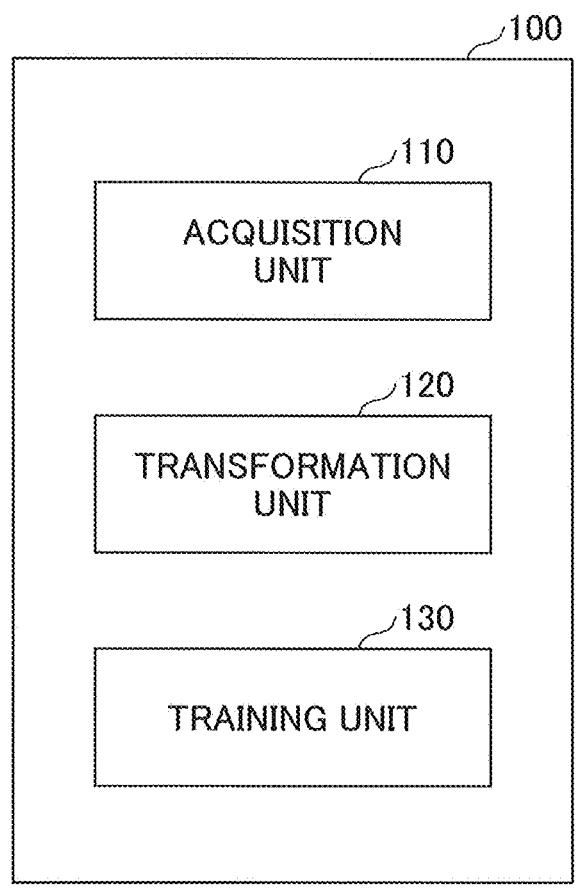
FIG. 2 is a block diagram for illustrating a functional arrangement of a training apparatus according to one embodiment of the present disclosure.

Next, a training apparatus according to one embodiment of the present disclosure is described with reference to FIGS. 2-4. FIG. 2 is a block diagram for illustrating a functional arrangement of a training apparatus according to one embodiment of the present disclosure.

As illustrated in FIG. 2, the training apparatus 100 has an acquisition unit 110, a transformation unit 120 and a training unit 130.

The acquisition unit 110 acquires training data including audio data including multiple audio components and separation audio data showing a certain audio component. Specifically, the acquisition unit 110 acquires a large number of sets of the audio data including multiple audio components and the separation audio data as the training data from the database 50. For example, the training data may be sets of audio data consisting of mixture of an accompaniment sound and a vocal sound and audio data consisting of only the vocal sound. Alternatively, the training data may be sets of audio data consisting of mixture of an accompaniment sound and a vocal sound and audio data consisting of only the accompaniment sound. Typically, the training data may consist of a data set including several thousands to ten thousands of sets. Also, in one embodiment, the multiple audio components may be audio components showing certain frequency distributions, and fundamental tones of the audio components change while distributions of harmonic components of the fundamental tones fall within certain ranges. Also, in one embodiment, the multiple audio components may be a certain type of instrumental sound or a vocal sound and may be audio components that belong to an instrumental sound or a vocal sound having a same type of tone, although their pitches are different.

The transformation unit 120 transforms the mixed audio data including multiple audio components and the separation audio data showing a certain audio component into respective image data. In one embodiment of the present disclosure, the image transformation may be performed in accordance with an image transformation scheme resulting in a logarithmic frequency axis such as constant Q transform. In other words, the transformation unit 120 may transform the respective audio data into three-dimensional spectrograms representing a time, a frequency and an intensity of an audio component in accordance with the constant Q transform. Specifically, image data according to one embodiment of the present disclosure may be implemented as a data array including data components in multiple dimensions such as a three-dimensional spectrogram.

According to the image transformation scheme resulting in a logarithmic frequency axis such as the constant Q transform, a lower frequency band can be imaged with a higher resolution than a higher frequency band. For example, FIGS. 3A and 3B illustrate spectrograms acquired by performing Fourier transform and the constant Q transform on audio data, respectively. As illustrated in FIG. 3A, for the audio data, most of signal components appear in a frequency band of less than 5000 Hz while few signal components appear in a high frequency band higher than 5000 Hz. Although many of principal sounds such as an instrumental sound and a vocal sound are generally included in a frequency band of less than 1000 Hz, a lower frequency band is illustrated with a lower resolution in the spectrogram as illustrated in FIG. 3A, and the particularly important frequency band of 1000 Hz is imaged with an insufficient resolution. On the other hand, in the spectrogram as illustrated in FIG. 3B, a frequency band of less than 4096 Hz is imaged with a relatively high resolution, and a lower frequency band, where signal components appear, can be imaged in more details. The resolution is higher in the particularly important frequency band of 1000 Hz. Thus, if the spectrograms are treated as images, the constant Q transform enables the lower frequency band for audio data to be represented with a higher resolution than the Fourier transform and is accordingly suitable for machine learning utilizing neural networks for image data as described below.

The training unit 130 trains an audio separation model for separating audio data showing a certain audio component with mixture image data imaged from audio data including multiple audio components and separation image data imaged from separation audio data to generate a trained audio separation model.

Note that the above trained audio separation model has a data structure such as a neural network that can be learned with a learning program for neural networks. However, if the trained audio separation model is installed in an electronic device such as a karaoke apparatus, besides implementations where a data structure such as neural networks executable by an execution program for neural networks is stored, similar functionalities may be implemented in the form of converted program codes and data that can be executed with generic programs such as C language.

An audio separation model according to one embodiment of the present disclosure may be implemented as a convolutional neural network (CNN), and the training unit 130 supplies training mixture image data, which is imaged from mixed audio data including multiple audio components, to the CNN and adjusts various parameters for the CNN to approximate output images from the CNN to separation image data corresponding to the mixture image data. In general, the CNN includes a convolutional layer to extract features of a local area in image data for different areas. For example, the training unit 130 performs convolutional operations on local time and frequency areas in the mixture image data to extract the features needed to separate respective audio components in a convolutional layer and generates image data resulting from extraction of a certain audio component in an inverse convolutional layer. As the features automatically extracted with machine learning using the CNN, for example, it is expected that a formant pattern or features similar to the formant pattern may be extracted, and the CNN is configured to include formants. Also, instead of automatic extraction of all features with the machine learning, a portion of feature extraction operations may be manually manipulated to extract the formant pattern as the features. In other words, it is basically difficult for a human being to logically derive and predict the features that may be automatically extracted with the machine learning, but there are some cases where such manual manipulation may improve a training speed or a training accuracy, for the features (the formant pattern in the present case) that can be described as being logically valid beforehand. For example, in the present case, a fundamental formant pattern for a local area is extracted with a lower convolutional layer whereas a formant pattern for the whole frequency specific to an individual audio component such as a vocal sound is extracted in an upper convolutional layer.

For example, the training unit 130 supplies a spectrogram transformed from the training audio data consisting of mixture of an accompaniment sound and a vocal sound with the constant Q transform to the CNN, compares an output spectrogram from the CNN with a spectrogram transformed from the corresponding training audio data, and updates parameters for the CNN to reduce an error between these spectrograms.

In one embodiment, the audio separation model may be implemented with the CNN including a pooling layer to allow for displacement in addition to the convolutional layer to conduct the above-stated image transformation. Specifically, the convolutional layer serves to extract feature information for image data per local time and frequency area while the pooling layer serves to modify displacement across the local areas. As a result, for example, a difference between tones (distributions of harmonic components) can be extracted as feature information while allowing for variations of pitches (displacement in a frequency direction), or an error of image data due to displacement of a spectrogram in a time direction can be allowed. The allowance of displacement enables the displacement to be allowed more effectively, because the frequency axis is scaled as a logarithmic axis instead of a linear axis.

Also in one embodiment, the training unit 130 may generate an audio separation model in accordance with GANs (Generative Adversarial Networks). Specifically, the training unit 130 may have a generator implemented as a neural network for converting incoming training mixture image data into separation image data and a discriminator implemented as a neural network for calculating, upon receiving the separation image data supplied from the generator and the training separation image data, their output values and learn parameters for the neural networks of the generator and the discriminator based on an error of the output values.

Figure 4:
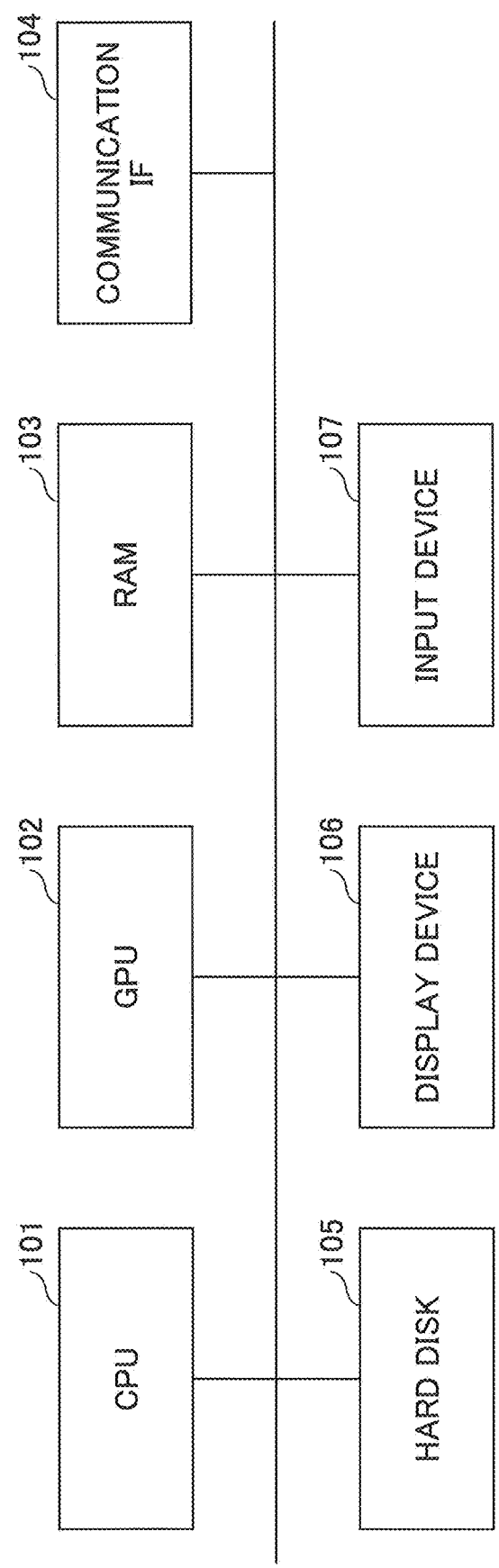
FIG. 4 is a block diagram for illustrating a hardware arrangement of the training apparatus according to one embodiment of the present disclosure.

As illustrated in FIG. 4, the training apparatus 100 may have a hardware arrangement with a CPU (Central Processing Unit) 101, a GPU (Graphics Processing Unit) 102, a RAM (Random Access Memory) 103, a communication interface (IF) 104, a hard disk 105, a display device 106 and an input device 107, for example. The CPU 101 and the GPU 102 perform various operations for the training apparatus 100 as stated below and serve as at least one processor or at least one controller that implements the acquisition unit 110, the transformation unit 120 and the training unit 130 as stated above. Particularly, the CPU 101 controls execution of the training operations in the training apparatus 100, and the GPU 102 performs the training operations such as matrix calculation or the like for machine learning. The RAM 103 and the hard disk 105 serve as memories for storing various data and programs for the training apparatus 100. Particularly, the RAM 103 serves as a working memory for storing working data for the CPU 101 and the GPU 102, and the hard disk 105 stores control programs and/or training data for the CPU 101 and the GPU 102. The communication IF 104 is a communication interface for acquiring the training data from the database 50. The display device 106 displays various information items such as contents, progress, results and so on for the operations, and the input device 107 is a device for inputting information and data such as a keyboard, a mouse or the like. However, the training apparatus 100 according to the present disclosure is not limited to the above-stated hardware arrangement and may have any other appropriate hardware arrangement.

Figure 5:
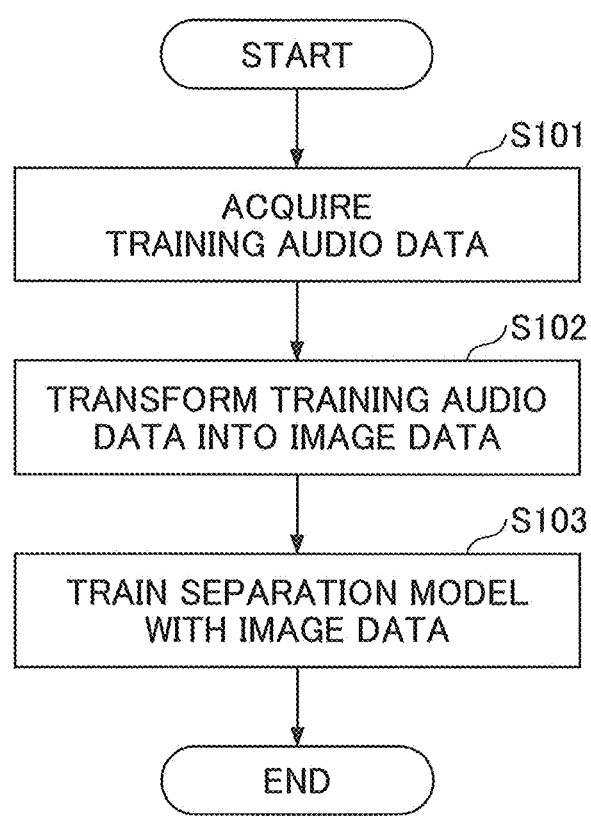
FIG. 5 is a flowchart for illustrating a training operation for an audio separation model according to one embodiment of the present disclosure.

Next, training operations at the training apparatus 100 according to one embodiment of the present disclosure are described with reference to FIGS. 5 and 6. FIG. 5 is a flowchart for illustrating a training operation for an audio separation model according to one embodiment of the present disclosure.

As illustrated in FIG. 5, at step S101, the acquisition unit 110 acquires training data including mixture audio data including multiple audio components and separation audio data showing a certain audio component. Specifically, the acquisition unit 110 acquires a large number of training data sets of the mixture audio data and the separation audio data from the database 50. For example, the mixture audio data may be audio data consisting of mixture of an accompaniment sound and a vocal sound, and the separation audio data may be audio data consisting of only the vocal sound.

At step S102, the transformation unit 120 transforms the mixture audio data and the separation audio data into mixture image data and separation image data, respectively, in accordance with an image transform scheme resulting in a logarithmic frequency axis. Specifically, the transformation unit 120 transforms the mixture audio data and the separation audio data in accordance with the constant Q transform to acquire a mixture spectrogram and a separation spectrogram, respectively. The spectrograms acquired with the constant Q transform have a higher resolution in a lower frequency band than a higher frequency band and are thus preferable to separate an audio component concentrated in the lower frequency band in the spectrogram through image analyses utilizing neural networks.

At step S103, the training unit 130 trains au audio separation model for separating separation image data from mixture image data with the mixture image data and the separation image data. Specifically, the training unit 130 configures the audio separation model with a CNN and learns parameters for the CNN with training image data. For example, the training unit 130 extracts features needed to separate respective audio components such as formants by performing convolutional operations on a local time and frequency range for the mixture image data in a convolutional layer of the CNN and generates image data resulting from separation of a certain audio component in an inverse convolutional layer. After that, the training unit 130 compares the generated image data with training separation image data and adjusts parameters for the CNN to reduce an error between these pieces of image data.

Then, the training unit 130 may perform the above-stated training operation on a predetermined number of training datasets and determine the finally acquired CNN as a trained audio separation model. Alternatively, the training unit 130 may determine the CNN acquired at the time point of the acquired error falling below a predetermined threshold as the trained audio separation model.

In one embodiment, as illustrated in FIG. 6, the training unit 130 may generate the audio separation model in accordance with GANs scheme. In the present embodiment, the training unit 130 may have a generator implemented as a neural network for converting incoming training mixture image data into separation image data and a discriminator implemented as a neural network for calculating output values for the separation image data supplied from the generator and training separation image data. Then, the training unit 130 may adjust parameters for the neural networks of the generator and the discriminator based on feedback information from the discriminator such as an error between the output values. In the embodiment as illustrated in FIG. 6, the mixture audio data is audio data consisting of mixture of an accompaniment sound and a vocal sound, and the separation audio data is audio data consisting of the vocal sound. However, the present disclosure is not limited to the above, and the mixture audio data may include any multiple audio components, and the separation audio data may be any audio component.

As illustrated in FIG. 6, at step S103_1, the training unit 130 supplies the training mixture audio data to the generator to acquire vocal audio data.

At step S103_2, the training unit 130 supplies the vocal audio data acquired from the generator to the discriminator to acquire an output value indicative of identified features or the like.

At step S103_3, the training unit 130 supplies training vocal audio data acquired from the database 50 to the discriminator to acquire an output value indicative of identified features or the like.

At step S103_4, the training unit 130 calculates an error between the acquired two output values and performs backpropagation on the neural networks of the generator and the discriminator based on the error.

At step S103_5, the training unit 130 updates parameters for the neural networks of the generator and the discriminator in accordance with execution results of the backpropagation.

Figure 7A:
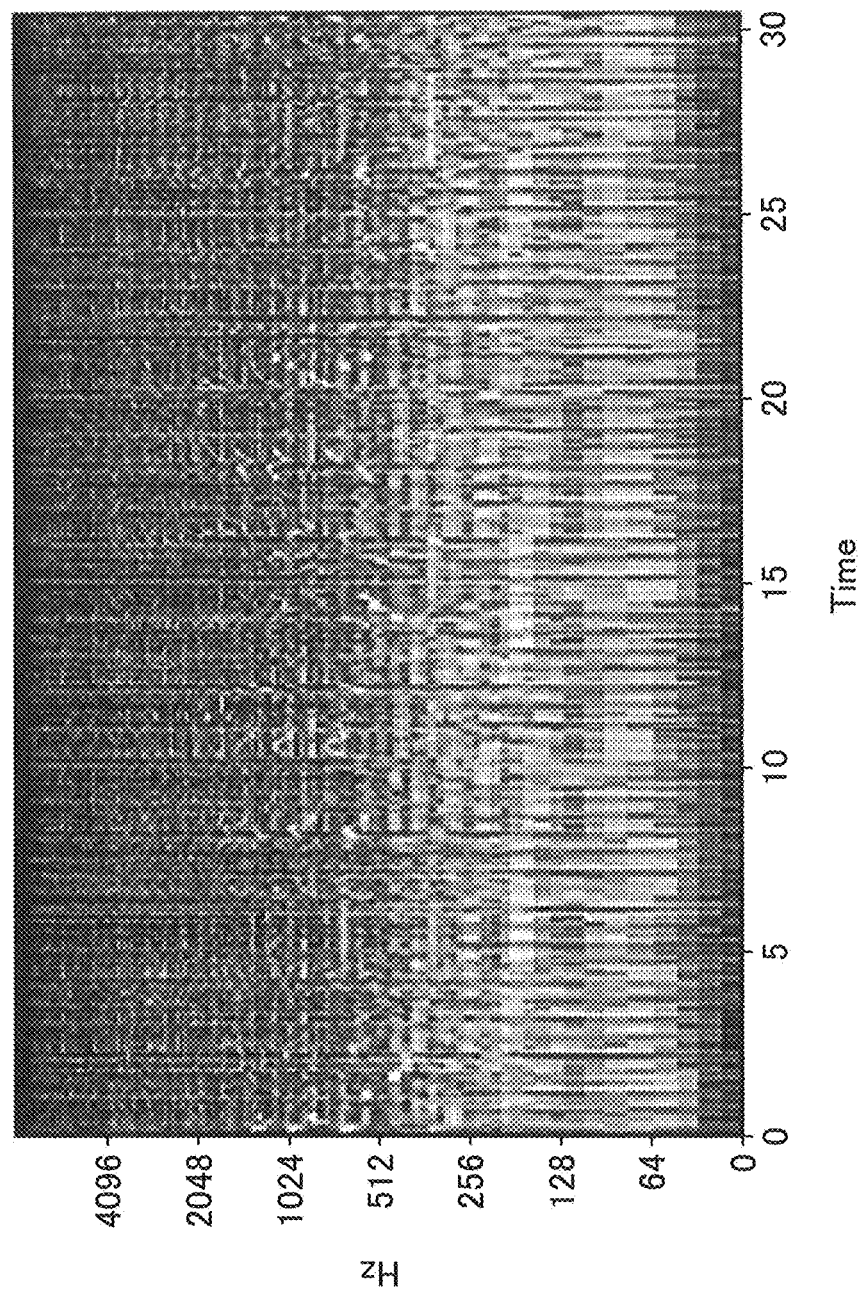
FIG. 7A is a diagram of spectrograms for audio data and separated audio data according to one embodiment of the present disclosure.

According to the above-stated training operations, the training apparatus 100 can separate a vocal spectrogram as illustrated in FIG. 7B from a training mixture spectrogram as illustrated in FIG. 7A, for example. In the separation vocal spectrogram, most of audio components appear in a lower frequency band of less than 1000 Hz, and separation performance can be improved by using constant Q transformed spectrograms that enable the lower frequency band to be imaged with a higher resolution than in imaging with Fourier transformed spectrograms.

Figure 8:
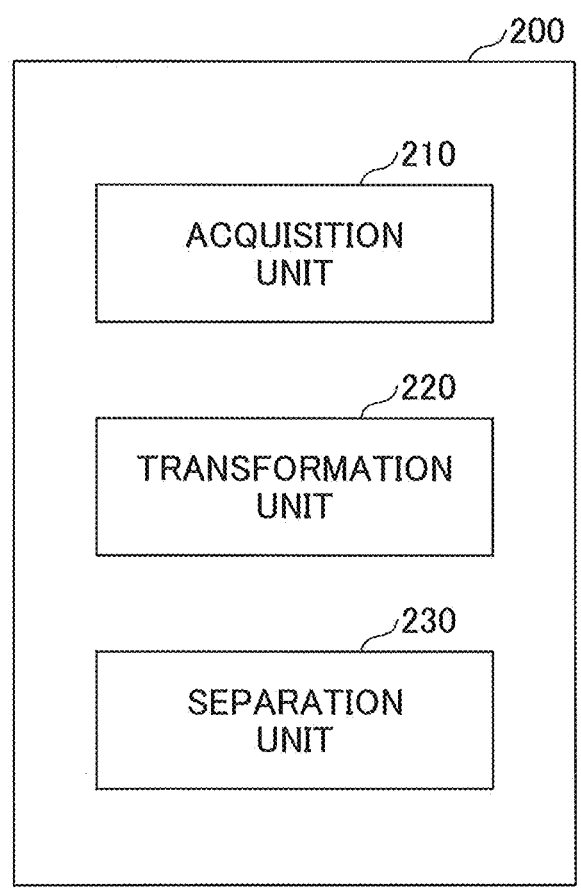
FIG. 8 is a block diagram for illustrating a functional arrangement of an audio separation apparatus according to one embodiment of the present disclosure.

Next, an audio separation apparatus according to one embodiment of the present disclosure is described with reference to FIGS. 8 and 9. FIG. 8 is a block diagram for illustrating a functional arrangement of an audio separation apparatus according to one embodiment of the present disclosure.

As illustrated in FIG. 8, the audio separation apparatus 200 has an acquisition unit 210, a transformation unit 220 and a separation unit 230. The audio separation apparatus 200 has a trained audio separation model provided from the training apparatus 100 and uses the audio separation model to separate audio data showing a certain audio component from mixture audio data.

The acquisition unit 210 acquires mixture audio data including multiple audio components. For example, the mixture audio data may be audio data consisting of mixture of an accompaniment sound and a vocal sound and may be generally unknown audio data unlike training audio data as stated above in conjunction with the training apparatus 100.

The transformation unit 220 transforms the mixture audio data into image data in accordance with an image transform scheme resulting in a logarithmic frequency axis. Specifically, the transformation unit 220 may divide the mixture audio data into frames, each of which is extracted per a predetermined number of samples, and perform the constant Q transform on each of the frames sequentially to acquire spectrograms for the respective frames.

The separation unit 230 supplies the image data to the trained audio separation model to acquire separation image data showing a certain audio component from the audio separation model and separates the certain audio component based on the separation image data. Specifically, the separation unit 230 uses the trained audio separation model from the trained apparatus 100 to acquire a separation spectrogram showing an audio component separated from a spectrogram for the mixture audio data. The separation spectrogram may be a spectrogram representing vocal audio data separated from the mixture audio data consisting of the accompaniment sound and the vocal sound.

Figure 9:
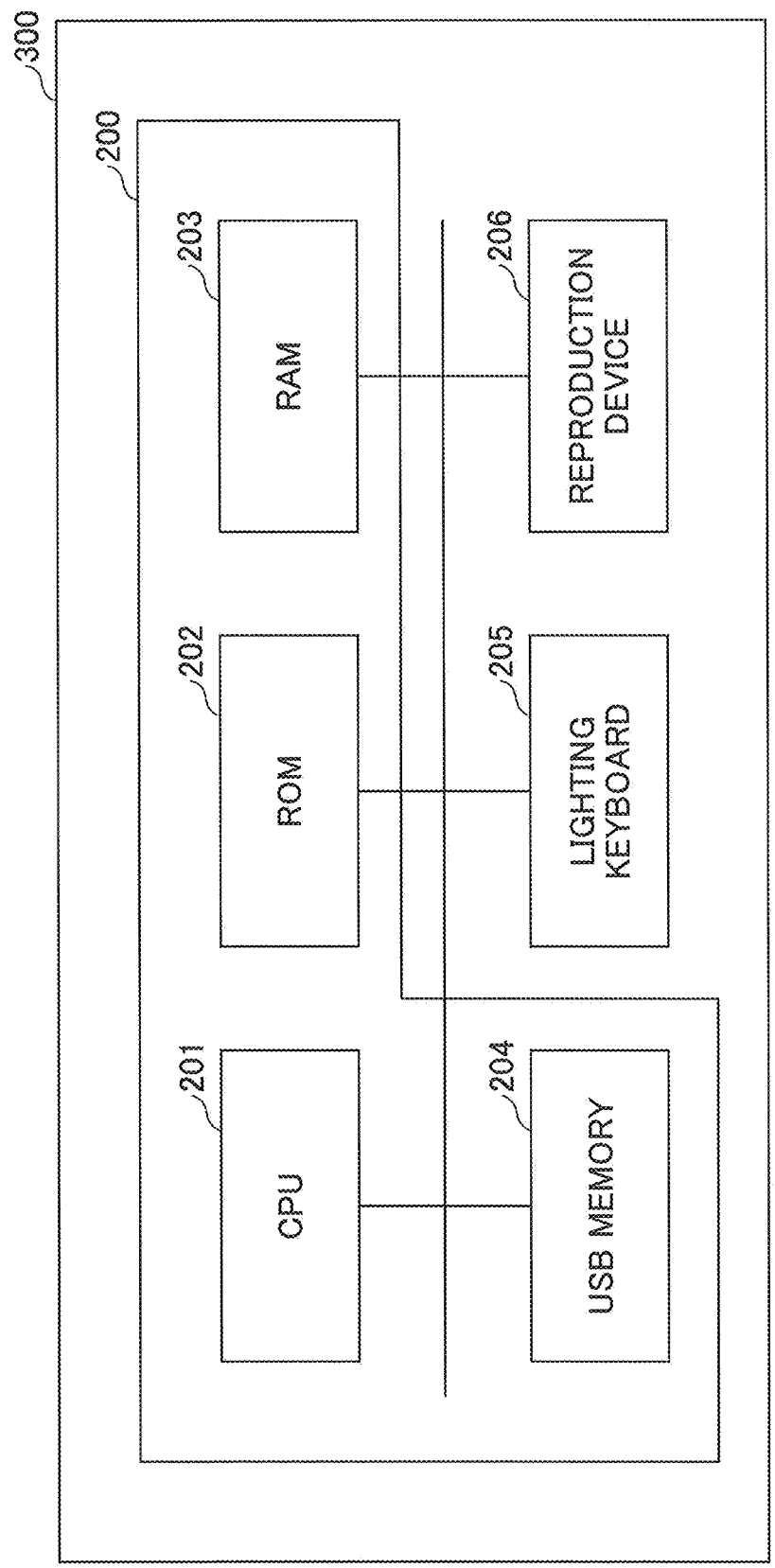
FIG. 9 is a block diagram for illustrating a hardware arrangement of an audio separation apparatus and an electronic instrumental apparatus according to one embodiment of the present disclosure.

Here, as illustrated in FIG. 9, the audio separation apparatus may have a hardware arrangement with a CPU 201, a ROM (Read-Only Memory) 202, a RAM 203 and a USB (Universal Serial Bus) memory port 204, for example. Furthermore, the electronic instrumental apparatus 300 may have a hardware arrangement with the audio separation apparatus 200, a lighting keyboard 205 and a reproduction device 206. The CPU 201 performs various operations stated below for the audio separation apparatus 200 and serves as at least one processor or at least one controller that implements the acquisition unit 210, the transformation unit 220 and the separation unit 230 as stated above. The ROM 202 and the RAM 203 serve as a memory that stores various data and programs at the audio separation apparatus 200. Particularly, the RAM 203 serves as a working memory that stores working data for the CPU 201, and the ROM 203 stores control programs and/or data for the CPU 201. The USB memory port 204 acquires reproduction data stored in a USB memory mounted by a user. In response to an instruction from the CPU 201, the lighting keyboard 205 extracts pitches for an audio component separated from reproduction data and lights a keyboard in accordance with the extracted pitches. The reproduction device 206 releases musical sounds generated from the reproduction data in accordance with instructions from the CPU 201. However, the audio separation apparatus 200 and the electronic instrumental apparatus 300 according to the present disclosure are not limited to the above-stated hardware arrangement and may have any other appropriate hardware arrangement. For example, one or more of the acquisition unit 210, the transformation unit 220 and the separation unit 230 as stated above may be implemented in an electronic circuit such as a filtering circuit.

In one embodiment, the separation unit 230 may supply frame-wise spectrograms to the audio separation model sequentially to acquire frame-wise separation spectrograms for vocal sounds and extract the most strongly pronounced frequency portion at each time point for the respective spectrograms, that is, a frequency portion that corresponds to a frequency having the largest amplitude in the spectrogram and is shown at the highest luminance, as the pitch at this time point. In this manner, the separation unit 230 can extract the separated vocal pitch. For example, in the spectrogram as illustrated in FIG. 3B, the extracted vocal pitches are not constant and fluctuate. Also, there is a case where the pitches may be out of musical scales of equal temperament that can emit sounds with usual keyboard instruments. Accordingly, the separation unit 230 may average fluctuating pitches within a frame and perform digitalization of musical scores such that the pitches can be in the closest musical scales of equal temperament. Here, the digitalization of musical scores is to generate sequence data where the pitch is made a MIDI note number and the tone corresponds to temporal data between a note-on and a note-off and is to generate SMF data, for example. In this manner, the separation unit 230 can light keys for a melody line corresponding to vocal pitches simultaneously with emitting sounds of the generated musical score data as a musical piece using a normal sequencer reproduction scheme.

Also in other embodiments, the audio separation model may be to separate accompaniment audio data from the mixture audio data consisting of mixture of an accompaniment sound and a vocal sound. Then, the training apparatus 100 may use lossless Fourier transform instead of the constant Q transform. In this case, the transformation unit 220 would divide the mixture audio data into frames per a predetermined number of samples and perform the Fourier transform on the respective frames sequentially to acquire frame-wise spectrograms as well as to store phase spectrograms acquired during the transform. The separation unit 230 supplies the frame-wise spectrograms to the audio separation model sequentially to acquire frame-wise spectrograms for separated accompaniment sounds and uses the stored phase spectrograms to perform inverse Fourier transform on the separation spectrograms to acquire audio data where the accompaniment sounds are separated. The acquired audio data can be reproduced with a normal audio data reproduction procedure.

Figure 10:
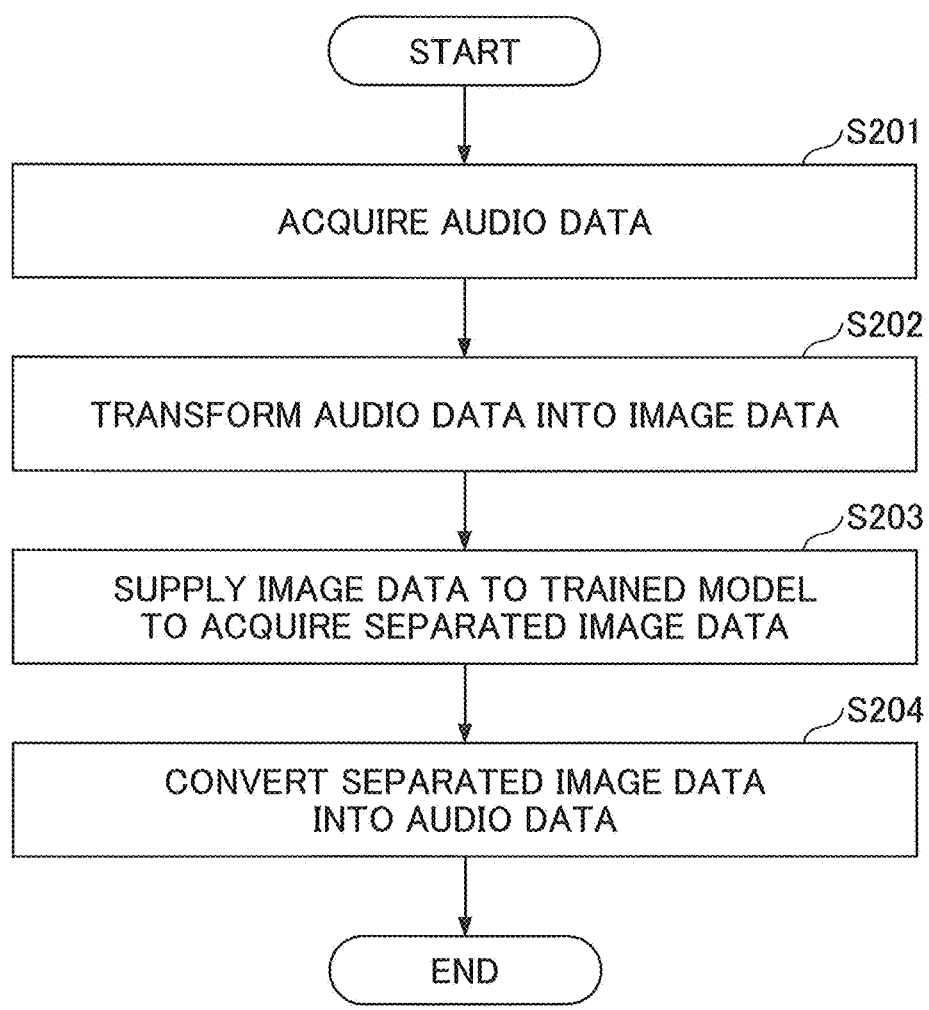
FIG. 10 is a flowchart for illustrating an audio separation operation according to one embodiment of the present disclosure.

Next, an audio separation operation at the audio separation apparatus 200 according to one embodiment of the present disclosure is described with reference to FIGS. 10 and 11. FIG. 10 is a flowchart for illustrating an audio separation operation according to one embodiment of the present disclosure.

As illustrated in FIG. 10, at step S201, the acquisition unit 210 acquires mixture audio data including multiple audio components. Specifically, the acquisition unit 210 acquires reproduction data provided from a user as the mixture audio data. For example, the mixture audio data may be audio data consisting of mixture of an accompaniment sound and a vocal sound.

At step S202, the transformation unit 220 transforms the mixture audio data into mixture image data in accordance with an image transform scheme resulting in a logarithmic frequency axis. Specifically, the transformation unit 220 transforms the mixture audio data in accordance with the constant Q transform to acquire a mixture spectrogram. The spectrogram acquired in accordance with the constant Q transform is of a higher image resolution in a lower frequency band than in a higher frequency band and is preferable to separate an audio component concentrated in the lower frequency band in the spectrogram with image analyses using a neural network.

At step S203, the separation unit 230 supplies the mixture image data to a trained audio separation model to acquire separation image data showing a certain audio component from the audio separation model and separates the certain audio component based on the separation image data. For example, the separation unit 230 may extract pitches for the certain audio component from the separation image data and perform digitalization of musical scores on the extracted pitches. The separation unit 230 may light keys for a melody line corresponding to the vocal pitches simultaneously with emitting sounds for the generated musical score data as a musical piece using a normal sequencer reproduction scheme.

Figure 11:
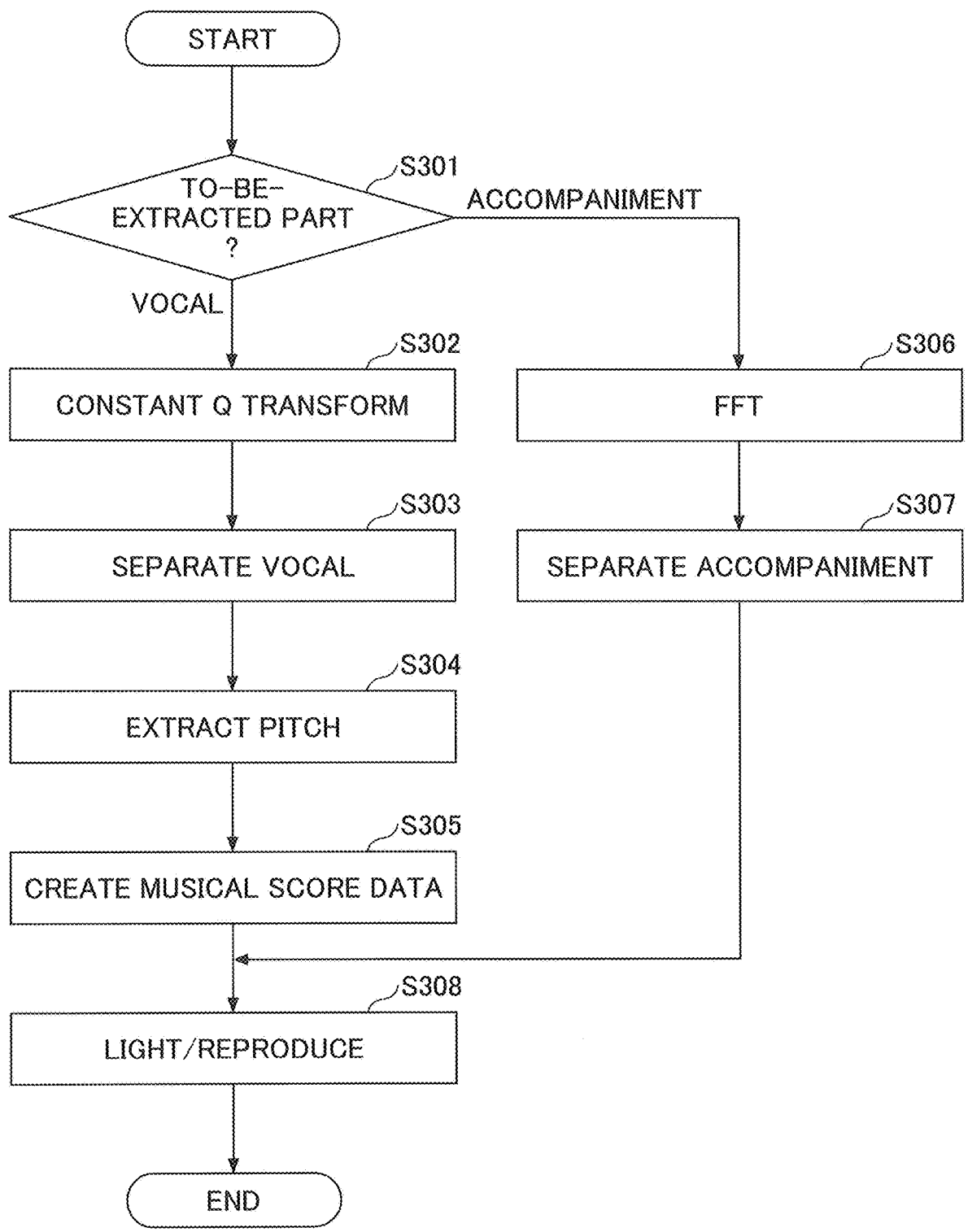
FIG. 11 is a flowchart for illustrating an audio operation performed by an electronic instrumental apparatus according to one embodiment of the present disclosure.

FIG. 11 is a flowchart for illustrating an audio operation with an electronic instrumental apparatus according to one embodiment of the present disclosure. The electronic instrumental apparatus 300 includes the audio separation apparatus 200 including a trained audio separation model for separating vocal audio data from mixture audio data consisting of mixture of an accompaniment sound and a vocal sound and a trained audio separation model for separating accompaniment audio data from the mixture audio data.

At step S301, the electronic instrumental apparatus 300 determines whether a to-be-extracted part corresponds to a vocal sound or an accompaniment sound. For example, the to-be-extracted part may be specified by a user.

If the to-be-extracted part corresponds to the vocal sound (S301: vocal), at step S302, the electronic instrumental apparatus performs the constant Q transform on incoming mixture audio data to acquire a mixture spectrogram.

At step S303, the electronic instrumental apparatus 300 supplies the mixture spectrogram to the trained audio separation model for separating vocal audio data from the mixture audio data to acquire a separation spectrogram showing the vocal audio data.

At step S304, the electronic instrumental apparatus 300 extracts pitches from the separation spectrogram.

At step S305, the electronic instrumental apparatus 300 generates musical score data from the extracted pitches.

On the other hand, if the to-be-extracted part is the accompaniment sound (S301: accompaniment), at step S306, the electronic instrumental apparatus 300 performs Fourier transform on the incoming mixture audio data to acquire a mixture spectrogram.

At step S307, the electronic instrumental apparatus 300 supplies the mixture spectrogram to the trained audio separation model for separating accompaniment audio data from the mixture audio data to acquire a separation spectrogram showing the accompaniment audio data and performs inverse Fourier transform on the acquired separation spectrogram to acquire accompaniment audio data.

At step S308, the electronic instrumental apparatus 300 lights keys in accordance with the musical score data generated at step S305 or the accompaniment audio data generated at step S307 and reproduces the audio data.

Second Embodiment

In the following embodiments, an audio extraction apparatus for extracting any one of a vocal sound and an accompaniment sound from a stereo audio source including the vocal sound and the accompaniment sound with a machine learning model is disclosed.

An audio extraction apparatus according to embodiments as stated below uses a trained audio extraction model, and the trained audio extraction model receives, as inputs, L channel audio data including an accompaniment sound and a vocal sound for L channel, R channel audio data including an accompaniment sound and a vocal sound for R channel, and center cut audio data generated from the L channel audio data and the R channel audio data and extracts any one of the accompaniment sound and the vocal sound. In other words, upon acquiring the stereo audio source composed of the L channel audio data and the R channel audio data, the audio extraction apparatus determines a difference between the L channel audio data and the R channel audio data to generate the center cut audio data and inputs the L channel audio data, the R channel audio data and the center cut audio data to the trained audio extraction model to extract any one of the accompaniment sound and the vocal sound.

Here, the center cutting is an operation to delete or reduce an audio component located at the center of a stereo audio source. Typically, the vocal sound is located near the center of the stereo audio source, and accordingly the vocal sound may be deleted or reduced through the center cutting. However, it is known that not only the vocal sound but also a portion of the accompaniment sound may be deleted or reduced, and some techniques for extracting the accompaniment sound from the stereo audio source faithfully are required.

In the audio extraction apparatus according to the present disclosure, a machine learning model is used to receive L and R channel audio data of a stereo audio source as well as center cut audio data thereof as inputs to the machine learning model to generate any one of an accompaniment sound and a vocal sound as an output from the machine learning model. In other words, any one of the accompaniment sound and the vocal sound can be extracted at a higher quality by restoring an audio component in the center cut audio data, which has been deleted unintentionally, from the L and R channel audio data.

Figure 12:
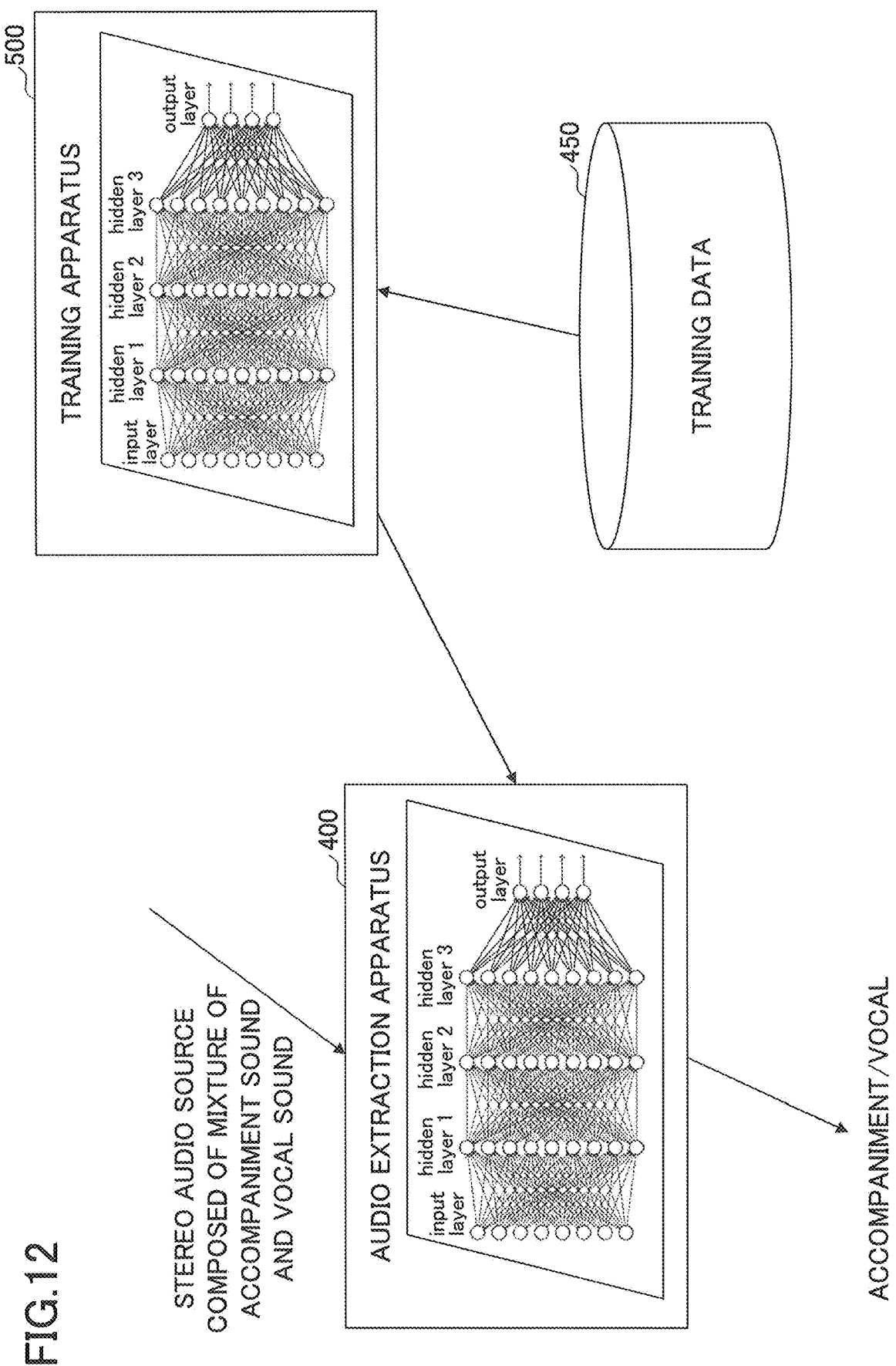
FIG. 12 is a schematic diagram for illustrating an audio extraction apparatus having a trained audio extraction model according to one embodiment of the present disclosure.

First, an audio extraction apparatus having a trained audio extraction model according to one embodiment of the present disclosure is described with reference to FIG. 12. FIG. 12 is a schematic diagram for illustrating the audio extraction apparatus having the trained audio extraction model according to one embodiment of the present disclosure.

As illustrated in FIG. 12, an audio extraction apparatus 400 according to one embodiment of the present disclosure has an audio extraction model that may be implemented as any type of neural network, but not limited to, such as a convolutional neural network and uses the audio extraction model trained by a training apparatus 500 using a training data storage 450 to extract any one of an accompaniment sound (which may be any of a stereo accompaniment sound and a monaural accompaniment sound) and a vocal sound from a stereo audio source composed of a mixture of the accompaniment sound and the vocal sound.

Figure 13:
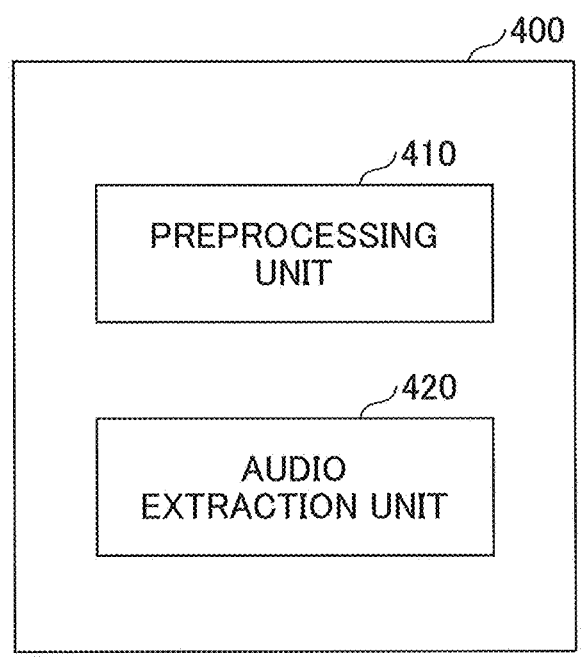
FIG. 13 is a block diagram for illustrating a functional arrangement of an audio extraction apparatus according to one embodiment of the present disclosure.

Next, an audio extraction apparatus according to one embodiment of the present disclosure is described with reference to FIGS. 13 and 14. FIG. 13 is a block diagram for illustrating a functional arrangement of an audio extraction apparatus according to one embodiment of the present disclosure.

As illustrated in FIG. 13, the audio extraction apparatus 400 has a preprocessing unit 410 and an audio extraction unit 420.

For a stereo audio source including L channel audio data including an accompaniment sound and a vocal sound for L channel and R channel audio data including an accompaniment sound and a vocal sound for R channel, the preprocessing unit 410 determines a difference between the L channel audio data and the R channel audio data to generate center cut audio data.

Specifically, for a given stereo audio source including a vocal sound and an accompaniment sound, the preprocessing unit 410 separates the stereo audio source into the L channel audio data and the R channel audio data. Here, the L channel audio data may be waveform data including an accompaniment sound (L) and a monaural vocal sound (M) for the L channel, and the R channel audio data may be waveform data including an accompaniment sound (R) and the monaural vocal sound (M) for the R channel.

Then, the preprocessing unit 410 determines a difference between the L channel audio data (L+M) and the R channel audio data (R+M). For example, the preprocessing unit 410 may subtract the R channel audio data (R+M) from the L channel audio data (L+M), that is, {(L+M)−(R+M)}, or subtract the L channel audio data (L+M) from the R channel audio data (R+M), that is, {(R+M)−(L+M)}, to acquire the center cut audio data (L−R) or (R−L). In other words, the center cut audio data is generated by deleting or reducing an audio component near the center of a frequency band for the stereo audio source from the stereo audio source, and typically not only a vocal sound located near the center but also other audio components (for example, a base accompaniment sound or the like) may be deleted or reduced.

After that, the preprocessing unit 410 performs a preprocessing operation such as short-time Fourier transform on the L channel audio data (L+M), the R channel audio data (R+M) and the center cut audio data (L−R) or (R−L) to acquire respective spectrograms. The preprocessing unit 410 provides the acquired spectrograms of the L channel audio data (L+M), the R channel audio data (R+M) and the center cut audio data (L−R) or (R−L) to the audio extraction unit 420.

The audio extraction unit 420 extracts any one of an accompaniment sound and a vocal sound from the L channel audio data, the R channel audio data and the center cut audio data with a trained machine learning model.

Specifically, the audio extraction unit 420 uses an audio extraction model, which has been trained in advance by the training apparatus 500 as stated below, to extract any one of the accompaniment sound and the vocal sound from the L channel audio data, the R channel audio data and the center cut audio data for the to-be-extracted stereo audio source provided from the preprocessing unit 410. As described in detail below, the audio extraction model according to the present disclosure may be implemented as any type of neural network such as a convolutional neural network and be trained to transform the respective spectrograms of the L channel audio data, the R channel audio data and the center cut audio data into a spectrogram of any one of the accompaniment sound and the vocal sound.

Note that although the audio extraction apparatus 400 according to the present embodiment has been described for the stereo audio source composed of the L channel audio data and the R channel audio data, the stereo audio source according to the present disclosure is not limited to the above and may be composed of audio data of any other several channels.

Also, the to-be-extracted stereo audio source is provided to the audio extraction apparatus 400 according to the above-stated embodiment, but the present disclosure is not limited to the above. The L channel audio data and the R channel audio data, which have been separated beforehand, may be provided to the audio extraction apparatus 400.

Figure 14:
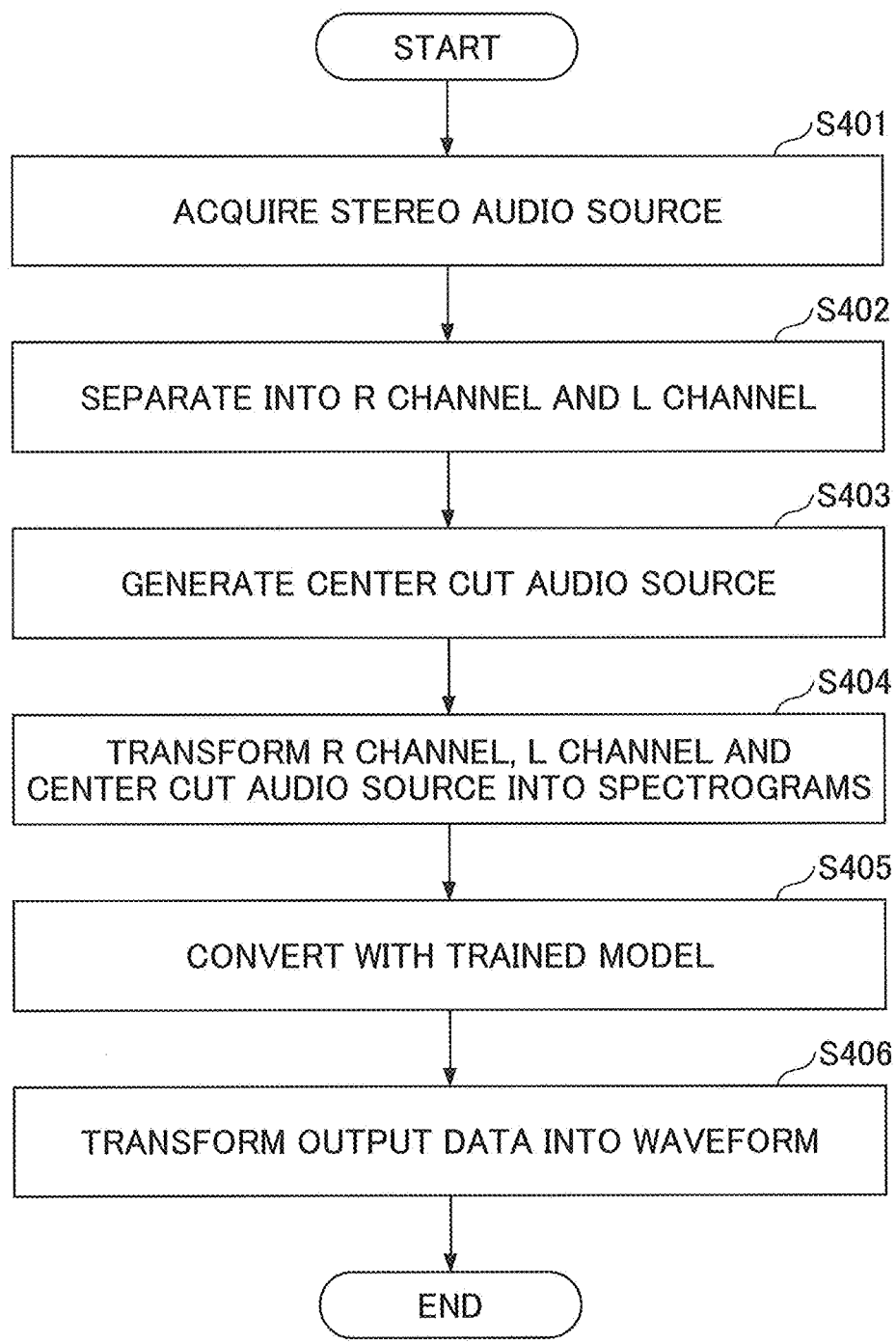
FIG. 14 is a flowchart for illustrating an audio extraction operation according to one embodiment of the present disclosure.

FIG. 14 is a flowchart for illustrating an audio extraction operation according to one embodiment of the present disclosure. The audio extraction operation may be implemented with the above-stated audio extraction apparatus 400 or a processor of the audio extraction apparatus 400.

As illustrated in FIG. 14, at step S401, the preprocessing unit 410 acquires a stereo audio source. For example, the stereo audio source may be composed of, but not limited to, waveform data of the L channel audio data including an accompaniment sound and a monaural vocal sound for the L channel and waveform data of the R channel audio data including an accompaniment sound and a monaural vocal sound for the R channel.

At step S402, the preprocessing unit 410 separates the incoming stereo audio source into the L channel audio data and the R channel audio data.

At step S403, the preprocessing unit 410 determines a difference between the L channel audio data and the R channel audio data to generate the center cut audio data. As stated above, the center cut audio data is generated by deleting or reducing an audio component near the center of a frequency band for the L channel audio data and the R channel audio data from the stereo audio source.

At step S404, the preprocessing unit 410 performs a preprocessing operation (for example, short-time Fourier transform or the like) on the L channel audio data, the R channel audio data and the center cut audio data to acquire respective spectrograms.

At step S405, the audio extraction unit 420 inputs the spectrogram of the L channel audio data, the spectrogram of the R channel audio data and the spectrogram of the center cut audio data to the trained audio extraction model and acquires a spectrogram of any one of the accompaniment sound and the vocal sound to be extracted. Note that for the to-be-extracted accompaniment sound, the audio extraction unit 420 may extract the stereo accompaniment sound (accompaniment sound for the L channel+accompaniment sound for the R channel) or any monaural accompaniment sound (accompaniment sound for the L channel/accompaniment sound for the R channel) depending on an output form of the trained audio extraction model.

At step S406, the audio extraction unit 420 transforms the spectrogram of the extracted accompaniment sound or the extracted vocal sound into waveform data. This transform may be performed by GriffinLim, for example.

Figure 15:
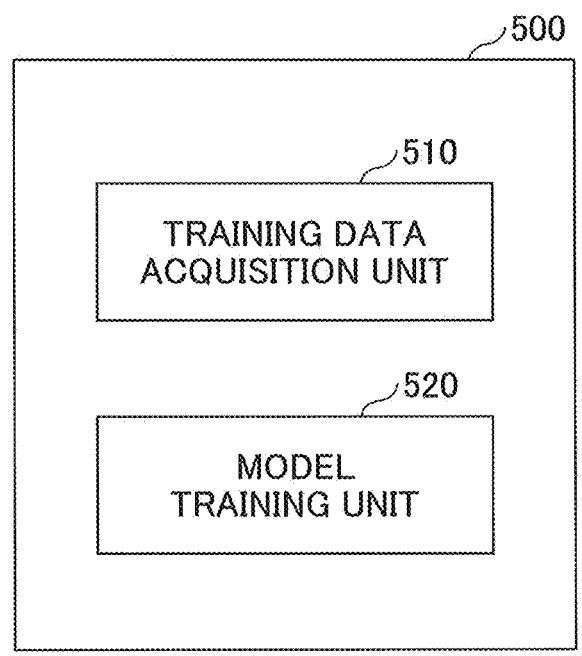
FIG. 15 is a block diagram for illustrating a functional arrangement of a training apparatus according to one embodiment of the present disclosure.

Next, a training apparatus for training the audio extraction model according to one embodiment of the present disclosure is described with reference to FIGS. 15 and 16. FIG. 15 is a block diagram for illustrating a functional arrangement of the training apparatus according to one embodiment of the present disclosure.

As illustrated in FIG. 15, the training apparatus 500 has a training data acquisition unit 510 and a model training unit 520.

For a stereo audio source including L channel audio data including an accompaniment sound and a vocal sound for the L channel and R channel audio data including an accompaniment sound and the vocal sound for the R channel, the training data acquisition unit 510 acquires the L channel audio data, the R channel audio data and center cut audio data, which is generated as a difference between the L channel audio data and the R channel audio data, as training input data and also acquires any one of the accompaniment sound and the vocal sound as training output data.

Specifically, the training data acquisition unit 510 acquires training data stored in the training data storage 450 and preprocesses the acquired training data. More specifically, the training data acquisition unit 510 acquires waveform data of the stereo audio source including the accompaniment sound and the vocal sound from the training data storage 450 and acquires waveform of any one of the accompaniment sound and the vocal sound to be extracted from the training data storage 450 as the training output data.

Then, the training data acquisition unit 510 separates the L channel audio data and the R channel audio data from the acquired stereo audio source and determines a difference between the L channel audio data and the R channel audio data to generate the center cut audio data.

After that, the training data acquisition unit 510 performs a preprocessing operation (for example, short-time Fourier transform) on the L channel audio data, the R channel audio data, the center cut audio data and a to-be-extracted one of the accompaniment sound or the vocal sound to acquire respective spectrograms and provides the acquired spectrograms of the L channel audio data, the R channel audio data, the center cut audio data and the to-be-extracted sound to the model training unit 520.

The model training unit 520 trains a machine learning model to generate training output data from training input data. Specifically, the model training unit 520 inputs the spectrogram of the L channel audio data, the spectrogram of the R channel audio data and the spectrogram of the center cut audio data to any type of neural network, such as a convolutional neural network, serving as the to-be-trained machine learning model and updates parameters for the machine learning model in accordance with backpropagation such that errors between the output data from the machine learning model and the spectrogram of the to-be-extracted sound of any one of the accompaniment sound and the vocal sound can be decreased. For example, if a predetermined update termination condition is satisfied, for example, if the update operation has been finished for all a predetermined number of training data pieces, if the error has converged to smaller than or equal to a predetermined threshold, if improvements of the error has converged to smaller than or equal to a predetermined threshold and so on, the model training unit 520 sets the updated machine learning model as the trained audio extraction model and provides it to the audio extraction apparatus 400.

Figure 16:
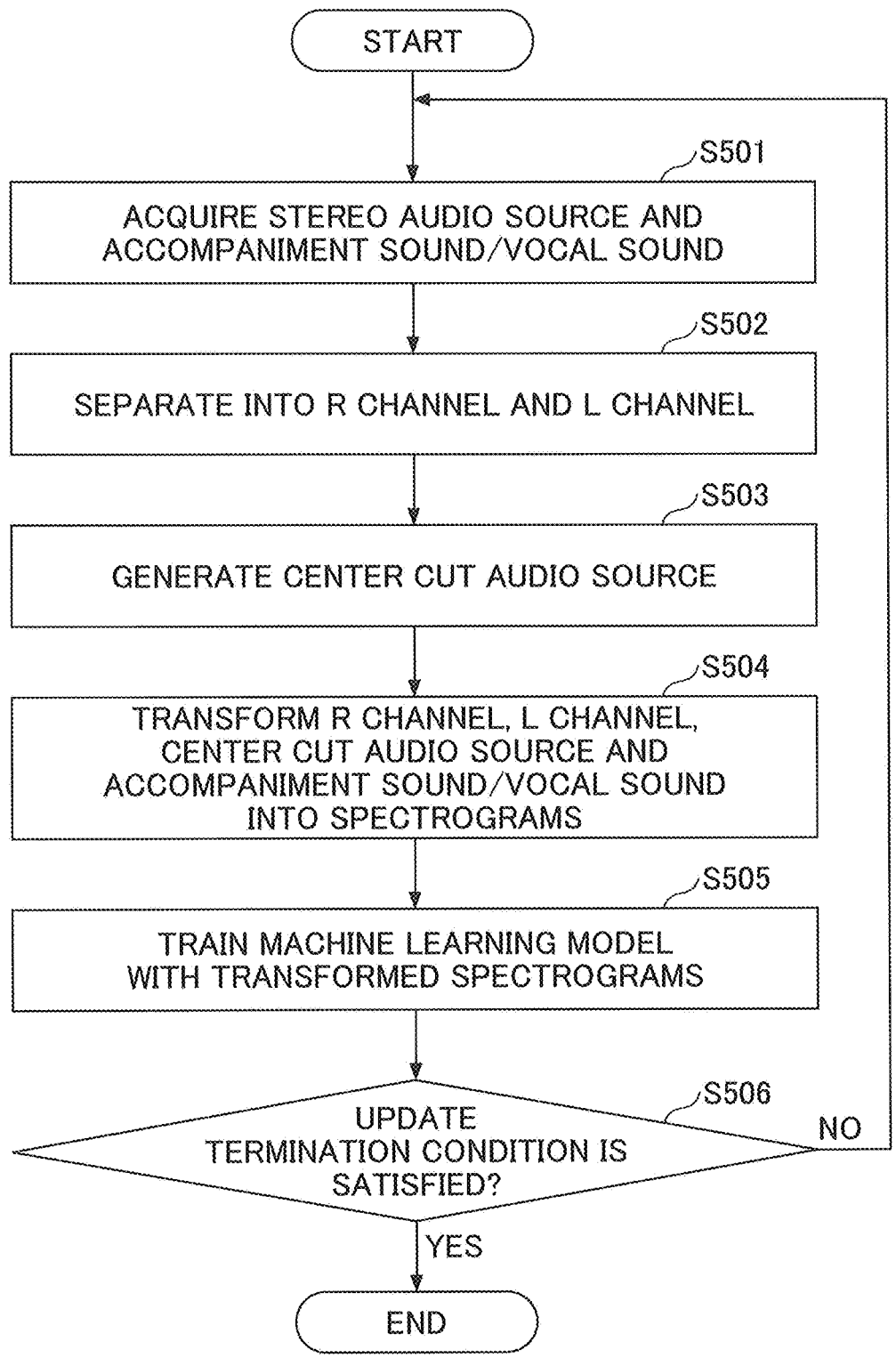
FIG. 16 is a flowchart for illustrating a training operation for an audio extraction model according to one embodiment of the present disclosure.

FIG. 16 is a flowchart for illustrating a training operation according to one embodiment of the present disclosure. The training operation may be implemented with the above-stated training apparatus 500 or a processor of the training apparatus 500.

As illustrated in FIG. 16, at step S501, the training data acquisition unit 510 acquires a stereo audio source and any one of an accompaniment sound and a vocal sound to be extracted. Here, the stereo audio source may be composed of, but not limited to, waveform data of the L channel audio data including an accompaniment sound and a monaural vocal sound for the L channel and waveform data of the R channel audio data including an accompaniment sound and a monaural vocal sound for the R channel. The accompaniment sound or the vocal sound may be composed of, but not limited to, waveform data of the accompaniment sound or the vocal sound included in the stereo audio source.

At step S502, the training data acquisition unit 510 separates the incoming stereo audio source into the L channel audio data and the R channel audio data.

At step S503, the training data acquisition unit 510 determines a difference between the L channel audio data and the R channel audio data to generate center cut audio data. As stated above, the center cut audio data may be generated by deleting or reducing an audio component located near the center of a frequency band for the stereo audio source from the stereo audio source.

At step S504, the training data acquisition unit 510 performs a preprocessing operation (for example, short-time Fourier transform) on the L channel audio data, the R channel audio data, the center cut audio data and any one of the accompaniment sound and the vocal sound to be extracted to acquire respective spectrograms.

At step S505, the model training unit 520 inputs the spectrogram of the L channel audio data, the spectrogram of the R channel audio data and the spectrogram of the center cut audio data to a pre-trained audio extraction model to acquire output data from the audio extraction model. Then, the model training unit 520 compares the acquired output data with the spectrogram of any one of the accompaniment sound and the vocal sound to be extracted and updates parameters for the audio extraction model in accordance with any appropriate neural network training algorithm such as backpropagation such that errors between them can be decreased.

At step S506, the model training unit 520 determines whether an update termination condition is satisfied. For example, the update termination condition may be completion of the update operation on a predetermined number of training data items, convergence of the error to smaller than or equal to a predetermined threshold, convergence of improvements of the error to smaller than or equal to a predetermined threshold, or the like. If the update termination condition is satisfied (S506: YES), the training operation ends. On the other hand, if the update termination condition is not satisfied (S506: NO), the training operation returns to step S501, and the above steps S501 to S505 are iterated.

Figure 17:
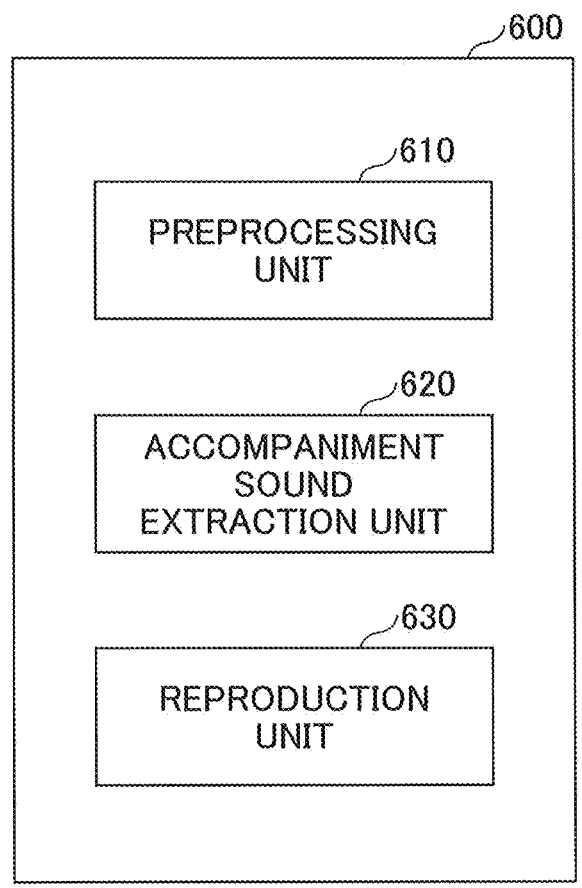
FIG. 17 is a block diagram for illustrating a functional arrangement of a karaoke apparatus (audio reproduction apparatus) according to one embodiment of the present disclosure.

Next, a karaoke apparatus according to one embodiment of the present disclosure is described with reference to FIG. 17. The karaoke apparatus (audio reproduction apparatus) is one exemplary application of the above-stated first and second embodiments and extracts an accompaniment sound from an audio source including the accompaniment sound and a vocal sound such as music files recorded on a CD (Compact Disk), mp3 format of music files acquired via networks or the like and reproduces the extracted accompaniment sound. FIG. 17 is a block diagram for illustrating a functional arrangement of a karaoke apparatus according to one embodiment of the present disclosure.

As illustrated in FIG. 17, a karaoke apparatus 600 has a preprocessing unit 610, an accompaniment sound extraction unit 620 and a reproduction unit 630.

The preprocessing unit 610 transforms audio data (for example, waveform data or the like) including an accompaniment sound and a vocal sound into multi-dimensional data (for example, spectrograms or the like) at least having a first axis corresponding to time and a second axis corresponding to audio information regarding an audio frequency.

For example, according to the first embodiment, the preprocessing unit 610 acquires the audio data composed of a mixture of the accompaniment sound and the vocal sound and transforms the mixture audio data into image data in accordance with an image transformation scheme having a logarithmic frequency axis. Specifically, the preprocessing unit 610 transforms the mixture audio data into a spectrogram in accordance with constant Q transform. For example, the preprocessing unit 610 may segment the mixture audio data into frames, each of which is formed of a predetermined number of samples, and perform the constant Q transform on the respective frames sequentially to acquire spectrograms of the respective frames.

On the other hand, according to the second embodiment, for a stereo audio source including the L channel audio data including an accompaniment sound and a vocal sound for the L channel and the R channel audio data including an accompaniment sound and a vocal sound for the R channel, the preprocessing unit 610 determines a difference between the L channel audio data and the R channel audio data to generate the center cut audio data.

Specifically, the preprocessing unit 610 acquires a stereo audio source for a musical piece selected by a user and separates the L channel audio data and the R channel audio data from the stereo audio source. Here, the L channel audio data may be waveform data including the accompaniment sound and the monaural vocal sound for the L channel, and the R channel audio data may be waveform data including the accompaniment sound and the monaural vocal sound for the R channel.

Then, the preprocessing unit 610 determines a difference between the L channel audio data and the R channel audio data to acquire the center cut audio data. After that, the preprocessing unit 610 performs a preprocessing operation (for example, short-time Fourier transform or the like) on the L channel audio data, the R channel audio data and the center cut audio data to acquire respective spectrograms and provides the acquired spectrograms of the L channel audio data, the R channel audio data and the center cut audio data to the accompaniment sound extraction unit 620.

The accompaniment sound extraction unit 620 inputs the transformed multi-dimensional data (for example, the spectrograms) acquired from the preprocessing unit 610 to a neural network, which has been trained to receive the incoming transformed multi-dimensional data (for example, the spectrograms) and output multi-dimensional data (for example, spectrograms) corresponding to audio data including the accompaniment sound without any mixture of the vocal sound, and then acquires the multi-dimensional data (for example, spectrograms) including only the accompaniment sound.

According to the second embodiment, the accompaniment sound extraction unit 620 extracts the accompaniment sound from the L channel audio data, the R channel audio data and the center cut audio data with a trained machine learning model.

Specifically, the accompaniment sound extraction unit 620 inputs the multi-dimensional data corresponding to the audio data including the accompaniment sound without mixing the vocal sound to a trained audio separation model to acquire multi-dimensional data indicative of only the accompaniment sound from the audio separation model and separates only the accompaniment sound based on the multi-dimensional data.

On the other hand, according to the second embodiment, the accompaniment sound extraction unit 620 uses an audio extraction model trained in advance by the above-stated training apparatus 500 to extract an accompaniment sound by deleting or reducing a vocal sound from the L channel audio data, the R channel audio data and the center cut audio data for a to-be-extracted stereo audio source provided from the preprocessing unit 610. Specifically, the accompaniment sound extraction unit 620 inputs respective spectrograms of the L channel audio data, the R channel audio data and the center cut audio data to the trained audio extraction model and acquires a spectrogram of the accompaniment sound from the audio extraction model.

The reproduction unit 630 reproduces the extracted accompaniment sound. Specifically, upon acquiring the spectrogram of the accompaniment sound from the accompaniment sound extraction unit 620, the reproduction unit 630 transforms the acquired spectrogram into waveform data in accordance with a transformation scheme such as GriffinLim and reproduces the transformed waveform data.

In one embodiment, the reproduction unit 630 may display lyrics in synchronization with the accompaniment sound. Specifically, the reproduction unit 630 may reproduce the accompaniment sound and also display the lyrics of the musical piece in synchronization with reproduction of the accompaniment sound. For example, lyric information of the musical piece may be acquired from a musical database via a network or from the stereo audio source of the musical piece through audio recognition. Also, synchronization information between the accompaniment sound and the lyrics may be acquired from the musical database or the like or at the audio recognition. The reproduction unit 630 may display the lyrics in synchronization with the accompaniment sound based on the acquired lyric information and synchronization information.

Figure 18:
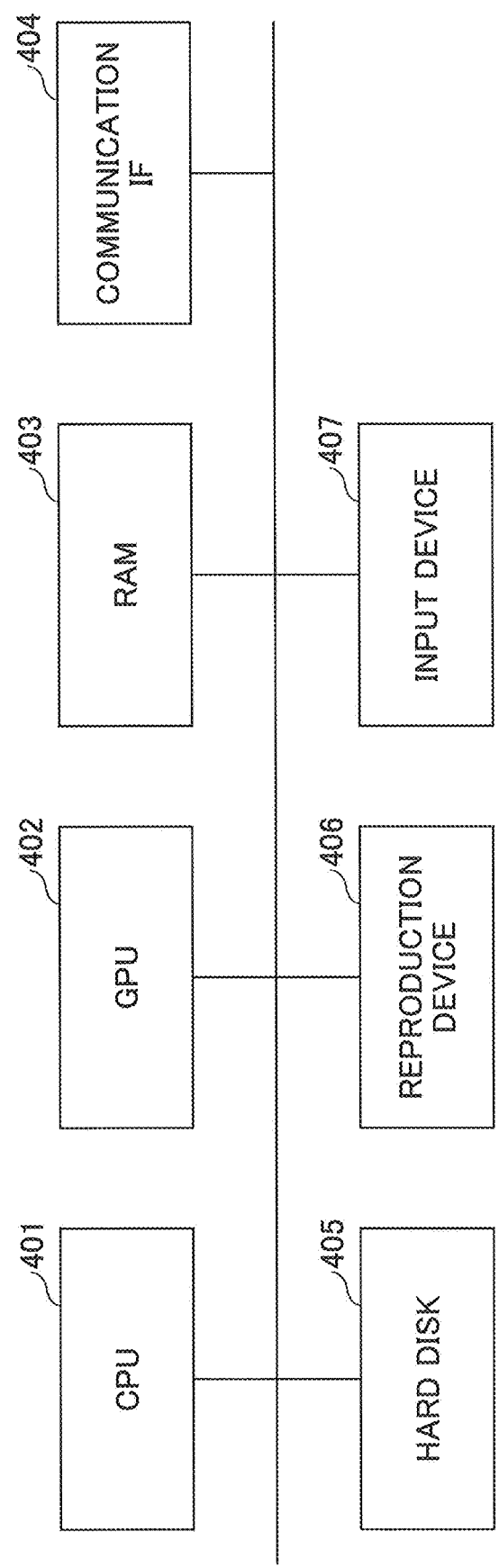
FIG. 18 is a block diagram for illustrating a hardware arrangement of an audio extraction apparatus, a training apparatus and a karaoke apparatus according to one embodiment of the present disclosure.

For example, as illustrated in FIG. 18, each of the audio extraction apparatus 400, the training apparatus 500 and the karaoke apparatus 600 as stated above may have a hardware arrangement with a CPU (Central Processing Unit) 401, a GPU (Graphics Processing Unit) 402, a RAM (Random Access Memory) 403, a communication interface (IF) 404, a hard disk 405, a reproduction device 406 and an input device 407. The CPU 401 and the GPU 402 serve as one or more processors or processing circuits and perform various operations in the audio extraction apparatus 400, the training apparatus 500 and the karaoke apparatus 600. Particularly, the CPU 401 controls execution of various operations in the audio extraction apparatus 400, the training apparatus 500 and the karaoke apparatus 600, and the GPU 402 performs various operations for training and executing machine learning models. The RAM 403 and the hard disk 405 serve as memories for storing various data and programs in the audio extraction apparatus 400, the training apparatus 500 and the karaoke apparatus 600. Particularly, the RAM 403 serves as a working memory for storing working data in the audio extraction apparatus 400, the training apparatus 500 and the karaoke apparatus 600, and the hard disk 405 stores control programs for the CPU 401 and the GPU 402 and/or training data. The communication IF 404 serves as a communication interface for acquiring the training data from the training data storage 450. The reproduction device 406 and the input device 407 are various devices (for example, a display, a speaker, a keyboard, a touch screen and so on) for displaying various information pieces such as contents, progresses, results or the like for operations, for reproducing the extracted accompaniment and vocal sounds and/or for inputting information and data. However, the audio extraction apparatus 400, the training apparatus 500 and the karaoke apparatus 600 according to the present disclosure are not limited to the above-stated hardware arrangement and may have any other appropriate hardware arrangement.

In one aspect of the present disclosure, there is provided an audio extraction apparatus comprising:

a preprocessing unit that determines, for a stereo audio source including first channel audio data including an accompaniment sound and a vocal sound for a first channel and second channel audio data including an accompaniment sound and a vocal sound for a second channel, a difference between the first channel audio data and the second channel audio data to generate center cut audio data; and an audio extraction unit that extracts any one of the accompaniment sound and the vocal sound from the first channel audio data, the second channel audio data and the center cut audio data with a trained machine learning model.

In one embodiment, the preprocessing unit may transform the first channel audio data, the second channel audio data and the center cut audio data into respective spectrograms, and the audio extraction unit may input the transformed respective spectrograms to the trained machine learning model to extract a spectrogram of any one of the accompaniment sound and the vocal sound.

In one embodiment, the center cut audio data may be generated by deleting an audio component near the center of a frequency band of the stereo audio source from the stereo audio source.

In one embodiment, the preprocessing unit may separate the first channel audio data and the second channel audio data from the stereo audio source.

In one aspect of the present disclosure, there is provided a training apparatus comprising:

a training data acquisition unit that acquires, for a stereo audio source including first channel audio data including an accompaniment sound and a vocal sound for a first channel and second channel audio data including an accompaniment sound and a vocal sound for a second channel, the first channel audio data, the second channel audio data and center cut audio data as training input data, wherein the center cut audio data is generated by determining a difference between the first channel audio data and the second channel audio data, and acquires any one of the accompaniment sound and the vocal sound as training output data; and a model training unit that trains a trained machine learning model to generate the training output data from the training input data.

In one embodiment, the machine learning model may output a spectrogram of the accompaniment sound as the training output data for incoming respective spectrograms of the first channel audio data, the second channel audio data and the center cut audio data at the training input data.

In one aspect of the present disclosure, there is provided an audio reproduction apparatus comprising:

a preprocessing unit that transforms audio data including an accompaniment sound and a vocal sound into first multi-dimensional data at least having a first axis corresponding to time and a second axis corresponding to audio information regarding an audio frequency;

an accompaniment sound extraction unit that inputs the transformed first multi-dimensional data to a neural network to acquire second multi-dimensional data, wherein the neural network is trained to output, for incoming multi-dimensional data corresponding to audio data including a mixture of an accompaniment sound and a vocal sound, multi-dimensional data corresponding to audio data including the accompaniment sound without any mixture of the vocal sound; and a reproduction unit that transforms the acquired second multi-dimensional data into second audio data including the accompaniment sound without any mixture of the vocal sound and reproduces the transformed second audio data.

In one embodiment, the reproduction unit may display lyrics in synchronization with the accompaniment sound.

In one aspect of the present disclosure, there is provided an audio extraction method comprising:

determining, by a processor, for a stereo audio source including first channel audio data including an accompaniment sound and a vocal sound for a first channel and second channel audio data including an accompaniment sound and a vocal sound for a second channel, a difference between the first channel audio data and the second channel audio data to generate center cut audio data; and extracting, by the processor, any one of the accompaniment sound and the vocal sound from the first channel audio data, the second channel audio data and the center cut audio data with a trained machine learning model.

In one aspect of the present disclosure, there is provided a machine learning method comprising:

acquiring, by a processor, for a stereo audio source including first channel audio data including an accompaniment sound and a vocal sound for a first channel and second channel audio data including an accompaniment sound and a vocal sound for a second channel, the first channel audio data, the second channel audio data and center cut audio data as training input data, wherein the center cut audio data is generated by determining a difference between the first channel audio data and the second channel audio data, and acquiring any one of the accompaniment sound and the vocal sound as training output data; and training, by the processor, a machine learning model to generate the training output data from the training input data.

In one aspect of the present disclosure, there is provided a program for causing a processor to:

determine, for a stereo audio source including first channel audio data including an accompaniment sound and a vocal sound for a first channel and second channel audio data including an accompaniment sound and a vocal sound for a second channel, a difference between the first channel audio data and the second channel audio data to generate center cut audio data; and extract any one of the accompaniment sound and the vocal sound from the first channel audio data, the second channel audio data and the center cut audio data with a trained machine learning model.

In one aspect of the present disclosure, there is provided a program for causing a processor to:

acquire, for a stereo audio source including first channel audio data including an accompaniment sound and a vocal sound for a first channel and second channel audio data including an accompaniment sound and a vocal sound for a second channel, the first channel audio data, the second channel audio data and center cut audio data as training input data, wherein the center cut audio data is generated by determining a difference between the first channel audio data and the second channel audio data, and acquire any one of the accompaniment sound and the vocal sound as training output data; and train a machine learning model to generate the training output data from the training input data.

In one aspect of the present disclosure, there is provided a computer readable storage medium for storing the above-stated programs.

Although the embodiments of the present disclosure have been described above, the present disclosure is not limited to the above-stated specific embodiments, and various modifications and changes can be made within the spirit and scope of the present disclosure as defined by claims as attached.

The present application claims benefits of priority of Japanese Patent Application No. 2018-120236 filed on Jun. 25, 2018, the whole contents of which are incorporated into the present application.

The invention claimed is:

1. An audio extraction apparatus comprising:
   a memory; and
   a processor that performs:
      a preprocessing operation to determine, for a stereo audio source including first channel audio data including an accompaniment sound and a vocal sound for a first channel and second channel audio data including an accompaniment sound and a vocal sound for a second channel, a difference between the first channel audio data and the second channel audio data to generate center cut audio data; and
      an audio extraction operation to input the first channel audio data, the second channel audio data and the center cut audio data to a trained machine learning model to extract any one of the accompaniment sound and the vocal sound.

2. The audio extraction apparatus as claimed in claim 1, wherein the preprocessing operation comprises transforming the first channel audio data, the second channel audio data and the center cut audio data into respective spectrograms, and the audio extraction operation comprises inputting the transformed respective spectrograms to the trained machine learning model to extract a spectrogram of any one of the accompaniment sound and the vocal sound.

3. The audio extraction apparatus as claimed in claim 1, wherein the preprocessing operation comprises transforming the first channel audio data, the second channel audio data and the center cut audio data into respective first multi-dimensional data, wherein the first multi-dimensional data is multi-dimensional data at least having a first axis corresponding to time and a second axis corresponding to audio information regarding an audio frequency, and the audio extraction operation comprises inputting the transformed first multi-dimensional data to the trained machine learning model to acquire second multi-dimensional data, wherein the second multi-dimensional data is the multi-dimensional data corresponding to any one of the accompaniment sound and the vocal sound, and transforming the acquired second multi-dimensional data into audio data that include no mixture of the accompaniment sound and the vocal sound and correspond to any one of the accompaniment sound and the vocal sound.

4. The audio extraction apparatus as claimed in claim 1, wherein the center cut audio data is generated by deleting or reducing an audio component near a center of a frequency band of the first channel audio data and the second channel audio data from the stereo audio source through a subtraction operation.

5. The audio extraction apparatus as claimed in claim 1, wherein the preprocessing operation comprises separating the first channel audio data and the second channel audio data from the stereo audio source.

6. The audio extraction apparatus as claimed in claim 2, wherein the trained machine learning model is a model trained to output a spectrogram including no mixture of the accompaniment sound and the vocal sound and corresponding to any one of the accompaniment sound and the vocal sound for incoming spectrograms corresponding to the first channel audio data, the second channel audio data and the center cut audio data.

7. An audio reproduction apparatus comprising:
   a memory; and
   a processor that performs:
      a preprocessing operation to transform audio data including an accompaniment sound and a vocal sound into first multi-dimensional data at least having a first axis corresponding to time and a second axis corresponding to audio information regarding an audio frequency;
      an accompaniment sound extraction operation to input the transformed first multi-dimensional data to a neural network to acquire second multi-dimensional data, wherein the neural network is trained to output, for incoming multi-dimensional data corresponding to audio data including a mixture of an accompaniment sound and a vocal sound, multi-dimensional data corresponding to audio data including the accompaniment sound without any mixture of the vocal sound; and
      a reproduction operation to transform the acquired second multi-dimensional data into second audio data including the accompaniment sound without any mixture of the vocal sound and reproduce the transformed second audio data.

8. The audio reproduction apparatus as claimed in claim 7, wherein the reproduction operation comprises displaying lyrics in synchronization with the accompaniment sound.

9. An audio extraction method comprising:
   determining, by a processor, for a stereo audio source including first channel audio data including an accompaniment sound and a vocal sound for a first channel and second channel audio data including an accompaniment sound and a vocal sound for a second channel, a difference between the first channel audio data and the second channel audio data to generate center cut audio data; and
   extracting, by the processor, any one of the accompaniment sound and the vocal sound from the first channel audio data, the second channel audio data and the center cut audio data with a trained machine learning model.

10. An audio reproduction method comprising:
  transforming, by a processor, audio data including an accompaniment sound and a vocal sound into first multi-dimensional data at least having a first axis corresponding to time and a second axis corresponding to audio information regarding an audio frequency;
  inputting, by the processor, the transformed first multi-dimensional data to a neural network to acquire second multi-dimensional data, wherein the neural network is trained to output, for incoming multi-dimensional data corresponding to audio data including a mixture of an accompaniment sound and a vocal sound, multi-dimensional data corresponding to audio data including the accompaniment sound without any mixture of the vocal sound; and
  transforming, by the processor, the acquired second multi-dimensional data into second audio data including the accompaniment sound without any mixture of the vocal sound and reproducing the transformed second audio data.

11. A machine learning method comprising:
  acquiring, by a processor, for a stereo audio source including first channel audio data including an accompaniment sound and a vocal sound for a first channel and second channel audio data including an accompaniment sound and a vocal sound for a second channel, the first channel audio data, the second channel audio data and center cut audio data as training input data, wherein the center cut audio data is generated by determining a difference between the first channel audio data and the second channel audio data, and acquiring any one of the accompaniment sound and the vocal sound as training output data; and
  training, by the processor, a machine learning model to generate the training output data from the training input data.

12. The machine learning method as claimed in claim 11, wherein the processor acquires multiple items of training data composed of pairs of the training input data and the training output data and trains the machine learning model based on the acquired multiple items of training data.

13. The machine learning method as claimed in claim 11, wherein the processor transforms the first channel audio data, the second channel audio data and the center cut audio data into respective spectrograms and trains the machine learning model to output a spectrogram of any one of the accompaniment sound and the vocal sound for the incoming transformed respective spectrograms.

14. The machine learning method as claimed in claim 11, wherein the processor transforms each of the first channel audio data, the second channel audio data and the center cut audio data into first multi-dimensional data, wherein the first multi-dimensional data is multi-dimensional data at least having a first axis corresponding to time and a second axis corresponding to audio information regarding an audio frequency and trains the machine learning model to output second multi-dimensional data for the incoming transformed first multi-dimensional data, wherein the second multi-dimensional data is the multi-dimensional data corresponding to any one of the accompaniment sound and the vocal sound.

15. The machine learning method as claimed in claim 11, wherein the machine learning model is implemented as a convolutional neural network including a convolutional layer for extracting features of different local areas in image data and a layer for modifying displacement across the local areas in the image data, and the processor trains the machine learning model by transforming audio data into image data having a logarithmic frequency axis and inputting the image data to the neural network.

16. The machine learning method as claimed in claim 11, wherein the machine learning model includes a generator for generating new image data based on inputted image data and a discriminator for discriminating a difference between the two image data, and the processor inputs first image data acquired by transforming audio data to the generator and inputs second image data outputted from the generator and the first image data to the discriminator to train the generator based on an error between respective outputs acquired from the discriminator.

17. The machine learning method as claimed in claim 11, wherein the processor generates the center cut audio data by deleting or reducing an audio component near a center of a frequency band of the first channel audio data and the second channel audio data from the stereo audio source through a subtraction operation.

\* \* \* \* \*